(12) United States Patent
Engel et al.

(10) Patent No.: US 6,755,037 B2
(45) Date of Patent: Jun. 29, 2004

(54) APPARATUS AND METHOD FOR EXTRACTING POTABLE WATER FROM ATMOSPHERE

(75) Inventors: Daniel R. Engel, Cleveland, OH (US); Matthew E. Clasby, Jr., Orange, TX (US)

(73) Assignee: Global Water Limited, Kowloontong (HK)

( * ) Notice: Subject to any disclaimer, the term of this patent is extended or adjusted under 35 U.S.C. 154(b) by 0 days.

(21) Appl. No.: 10/305,611

(22) Filed: Nov. 27, 2002

(65) Prior Publication Data

US 2004/0040322 A1 Mar. 4, 2004

Related U.S. Application Data

(60) Provisional application No. 60/407,144, filed on Aug. 30, 2002.

(51) Int. Cl.[7] ............................ F25D 17/00; F25D 21/00
(52) U.S. Cl. ............................................. 62/177; 62/150
(58) Field of Search ........................... 62/177, 150, 272, 62/291, 285, 93, 236

(56) References Cited

U.S. PATENT DOCUMENTS

| | | | | |
|---|---|---|---|---|
| 3,498,077 A | * | 3/1970 | Gerard et al. | 62/260 |
| 3,675,442 A | * | 7/1972 | Swanson | 62/285 |
| 4,182,132 A | * | 1/1980 | Nasser | 62/93 |
| 4,351,651 A | * | 9/1982 | Courneya | 55/210 |
| 4,433,552 A | * | 2/1984 | Smith | 62/93 |
| 5,259,203 A | * | 11/1993 | Engel et al. | 62/150 |
| 5,669,221 A | * | 9/1997 | LeBleu et al. | 62/92 |
| 5,845,504 A | * | 12/1998 | LeBleu | 62/92 |
| 6,058,718 A | * | 5/2000 | Forsberg et al. | 62/125 |
| 6,182,453 B1 | * | 2/2001 | Forsberg | 62/125 |
| 2003/0094011 A1 | * | 5/2003 | Zakryk et al. | 62/291 |
| 2003/0097763 A1 | * | 5/2003 | Morgan et al. | 34/468 |

* cited by examiner

Primary Examiner—Marc Norman
(74) Attorney, Agent, or Firm—Kenneth A. Roddy

(57) ABSTRACT

Apparatus and method for extracting filtered potable drinking water from air through the use of a refrigeration system (10–10R) including a compressor (12), evaporator (39), fan (56) condenser (30), and a reservoir system (14–14D) may be provided as an indoor unit (10–10F), window or wall mounted unit (10G–10J), or a portable or mobile indoor/outdoor unit (10M–10L), and may be integrated with an existing air conditioning system (10K, 10L) and/or a conventional refrigerator (10J–10L), or mounted in a vehicle (10R). The apparatus may also function as a dehumidifier, an air purifier, or a heat pump for cooling or heating air. In some embodiments the compressor, condenser, and water dispenser are remote from the housing. Collected water may be cooled by a secondary evaporator (44) and heated by a secondary condenser (35) or strip heater (13B). The secondary condenser and secondary evaporator may be connected with a secondary compressor (12A) to isolate the system for cooling water from that of condensing the air.

20 Claims, 20 Drawing Sheets

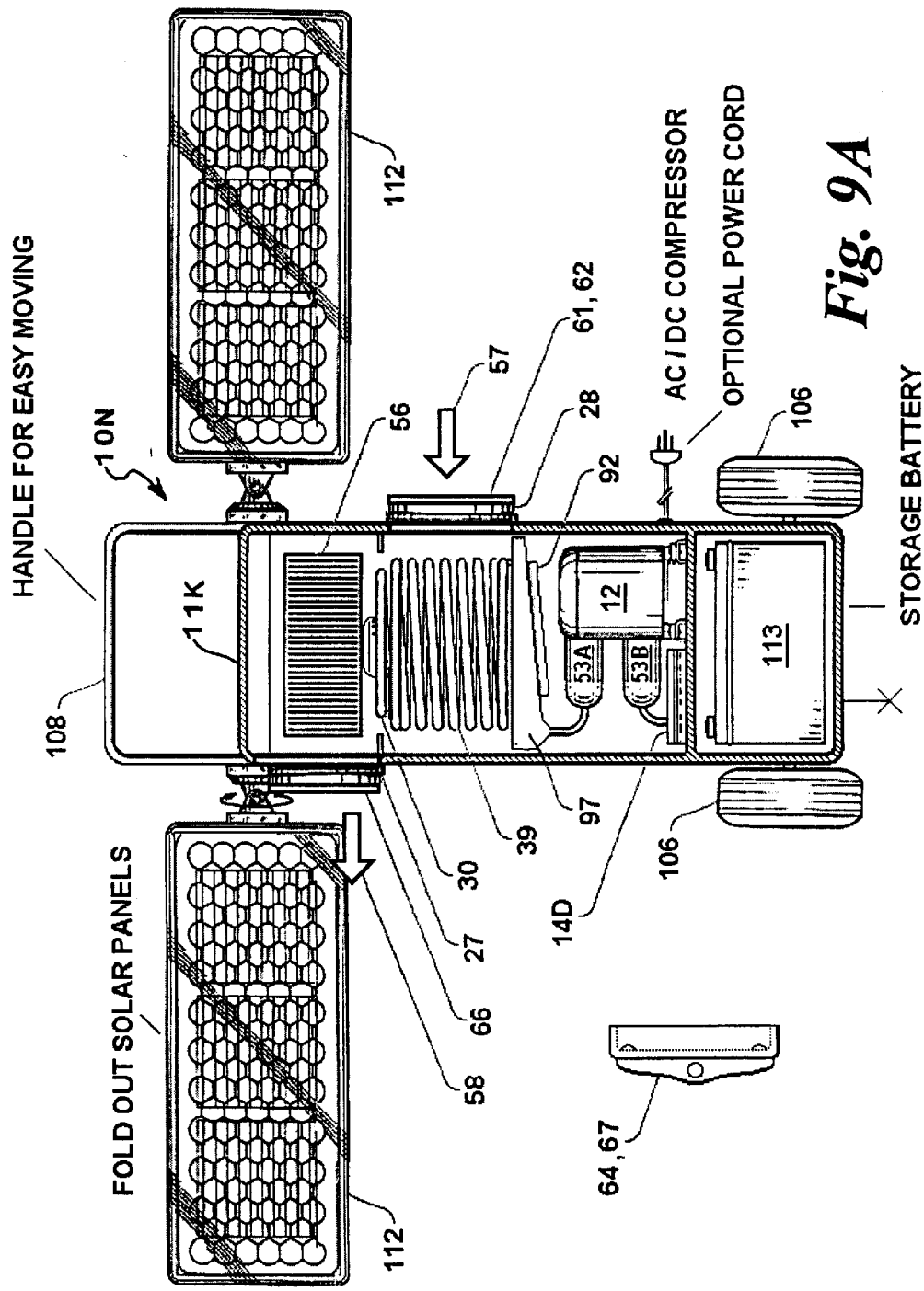

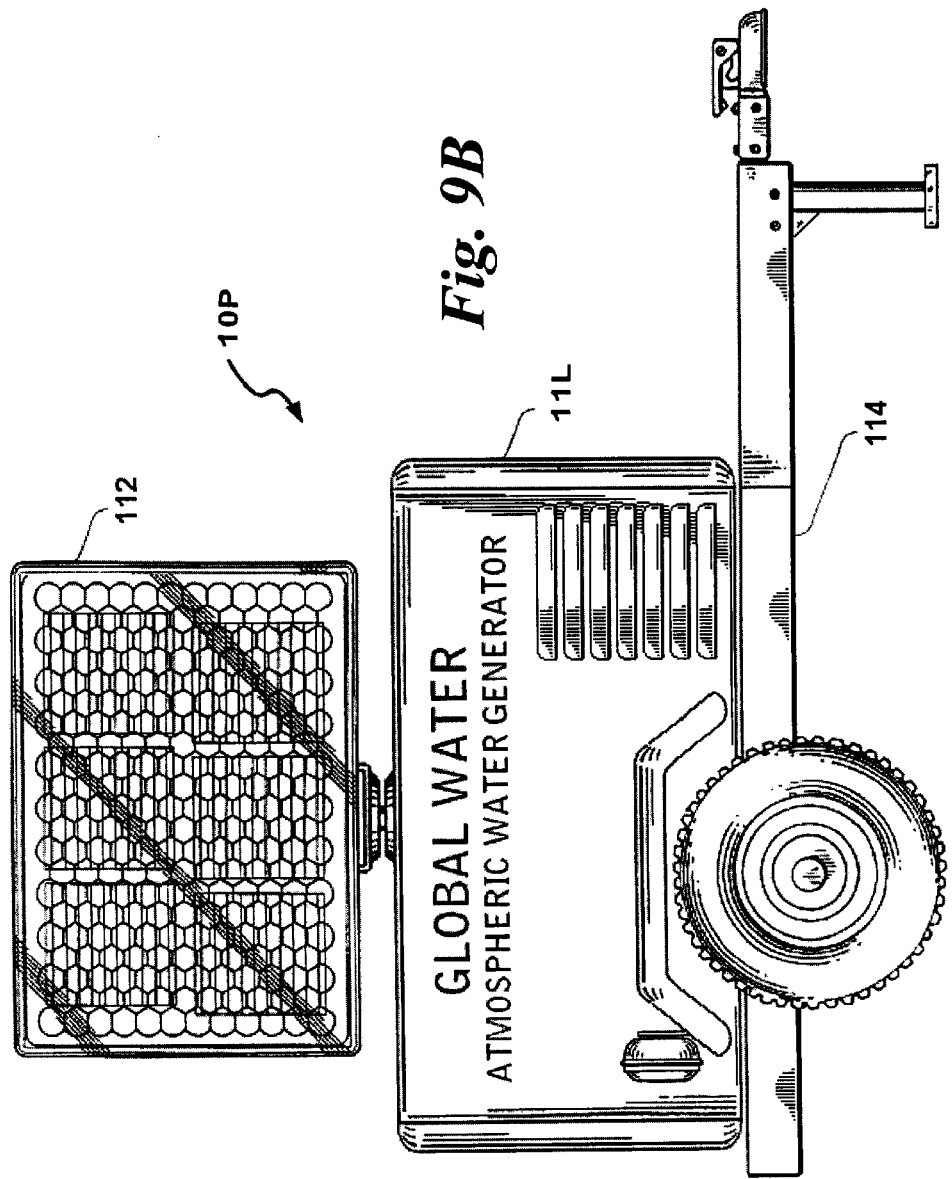

APPARATUS AND METHOD FOR EXTRACTING POTABLE WATER FROM ATMOSPHERE

CROSS REFERENCE TO RELATED APPLICATION

This application claims priority of U.S. Provisional Application Serial No. 60/407,144, filed Aug. 30, 2002.

BACKGROUND OF THE INVENTION

1. Field of the Invention

This invention relates generally to apparatus and methods for the creation of potable water, and more particularly to an apparatus and method for effectively extracting potable drinking water from moisture-laden air at ambient temperature through the use of a refrigeration system.

2. Description of the Related Art

Potable water is scarce or non-existent in many areas of the earth and there have been many attempts to provide potable water for drinking and such like purposes, however, past techniques proved to be very expensive or inefficient.

There are several patents that disclose various apparatus and methods for extracting potable water from the atmosphere.

Gerard et al, U.S. Pat. No. 3,498,077 discloses an apparatus and method for extracting moisture from the atmosphere which is suitable for use in seashore or island area. Cold seawater is pumped to condensers on shore which intercept the high humidity maritime air masses. The apparatus is powered by water driven turbines or windmills.

Swanson U.S. Pat. No. 3,675,442 discloses an atmospheric water collector which employs cooling coil immersed in a fresh water bath which cools the bath (not the drinking water). The cooled water is pumped through a conduit and condensing frame. Moisture is condensed from winds at ambient temperature passing over the condensing frame and drains into a collector. If the condensed water is below a predetermined temperature it is mixed with the fresh water bath. Thus, the water being used as the refrigerant is periodically mixed with the condensed water subjecting it to contamination and making the consumption of the water questionable.

Nasser et al, U.S. Pat. No. 4,182,132 discloses a device requiring two fans and two air chambers for operation, and suggests mounting the device on a post and above the tallest building. The two fans operate in tandem to reverse the air flow to be drawn through the evaporator and they cannot exhaust the cooled air through the evaporator due to their intake opening. This causes air of ambient temperature to be drawn into and through the condenser resulting in the loss of efficiency and condensation. Because the air is pushed through the evaporator it will cause partial drying of the newly formed condensation and result in loss of condensation and reduced output and efficiency. The present invention, on the other hand, pulls the air stream through the evaporator, and exhausts the residing air which has had the temperature reduced, through the condenser, thereby increasing efficiency and increasing condensation.

Courneya, U.S. Pat. No. 4,351,651 discloses an apparatus and method for extracting potable water from air at atmospheric temperature through the use of a heat exchanger which is which buried under ground or placed beneath the sea to produce a temperature at or near subsurface temperature and directing moisture-laden air from the surface through the cold heat exchanger.

Smith, U.S. Pat. No. 4,433,552 discloses a wind powered apparatus and method for recovering atmospheric moisture utilizing a wind driven electrical generator mounted within an air duct housing for powering a refrigeration system having an evaporator positioned in the duct for condensing moisture, a condenser, a coolant canister positioned in the duct and including an endothermic material therein for removing heat from the airstream causing condensation on the coolant canister.

LeBleu et al, U.S. Pat. No. 5,669,221, LeBleu, U.S. Pat. No. 5,845,504, Forsberg et al, U.S. Pat. No. 6,058,718, and Forsberg, U.S. Pat. No. 6,182,453 disclose portable, potable water recovery and dispensing apparatus.

The present invention utilizes some of the features that are described in our previous W.S. Pat. No. 5,259,203, which is hereby incorporated by reference to the same extent as if fully set forth herein. The present invention incorporates significant improvements in structure and operation over the previous patent.

The present invention is distinguished over the prior art in general, and these patents in particular by an apparatus and method for extracting potable drinking water from moisture-laden atmospheric air through the use of a refrigeration system. The apparatus may be provided as an indoor free-standing unit, window or wall mounted unit, or a portable or mobile indoor/outdoor unit, and may be integrated with an existing air conditioning system and/or a conventional refrigerator, or mounted in a vehicle. The apparatus may also function as a dehumidifier, an air purifier, or a heat pump for cooling or heating air. A compressor, evaporator unit, fan, condenser unit, and a reservoir system that may have separate ambient, cool or warm water compartments are contained within a housing. The primary evaporator and condenser may be coiled and nested together with the condenser disposed in the inner space of the evaporator, allowing greater surface area of both the evaporator and the condenser and increasing the efficiency, moving greater amounts of air and increasing the output of condensation. In some embodiments the compressor, condenser, and water dispenser are remote from the housing. Air is conducted through a filter system and across the evaporator and exhausted across the condenser to clean and cool the air. Condensation from the evaporator is directed to the reservoir system through a filtration system and water seal. A secondary evaporator may be submersed in or around a cool water reservoir for cooling the water and a secondary condenser may be submersed in a warm water reservoir for heating the water or a strip heater may be used. The secondary condenser and secondary evaporator may be connected with a secondary compressor to isolate the refrigeration system for cooling the water from that of condensing the atmospheric moisture.

A control module controls the system operation and may include a microprocessor for assuring maximum condensation and a removable I.C. program module to alter the operation for specific conditions. A humidistat may also be provided to maximize efficiency of atmospheric condensation throughout various time periods and in various climates. The refrigeration system may incorporate singular or multiple components in simultaneous or independent operation.

SUMMARY OF THE INVENTION

It is therefore an object of the present invention to provide an apparatus and method for obtaining potable water.

It is another object of this invention to provide an apparatus and method for extraction of potable water from atmospheric air.

Another object of this invention is to provide an apparatus and method for heating or cooling potable water collected from the atmosphere.

Another object of this invention is to provide an apparatus and method for extracting potable water from atmospheric air which may be operated by computer control and may use removable and interchangeable program modules.

Another object of this invention is to provide an apparatus and method for extracting potable water from atmospheric air wherein the extraction means also serves as the means of heating and cooling the potable water.

Another object of this invention is to provide an apparatus and method for extracting potable water from atmospheric air wherein more that one compressor may be operatively connected with a plurality of evaporators and or condensers to balance the load and system.

Another object of this invention is to provide an apparatus and method for extracting potable water from atmospheric air which also functions as a wall mounted air conditioning system for a building, and the hot air exhaust, which is a byproduct of the condensation process. may be redirected and used as a source of heat.

Another object of this invention is to provide an apparatus and method for extracting-potable water from atmospheric air which may be provided as an indoor freestanding unit, window or wall mounted unit, or a portable or mobile indoor/outdoor unit, and may be combined with an existing air conditioning system and/or a conventional refrigerator, or mounted in a vehicle.

Another object of this invention is to provide an apparatus and method for extracting potable water from atmospheric air which, in addition to producing potable water, may also function as a dehumidifier, an air purifier, or a heat pump for cooling or heating air.

Another object of this invention is to provide an apparatus and method for extracting potable water from atmospheric air having reservoirs that may be easily installed and removed.

A further object of this invention is to provide an apparatus for extracting potable water from atmospheric air having a high quality filtration system, which may include electrostatic. ozonator, UV treatment, carbon block, and /or granular activated carbon for providing filtered drinking water of very high quality.

A still further object of this invention is to provide an apparatus for extracting potable water from atmospheric air which is simple in construction, economical to manufacture, and rugged and reliable in operation.

Other objects of the invention will become apparent from time to time throughout the specification and claims as hereinafter related.

The above noted objects and other objects of the invention are accomplished by the present apparatus and method for extracting potable drinking water from moisture-laden atmospheric air through the use of one or more refrigeration systems. The apparatus may be provided as an indoor freestanding unit, window or wall mounted unit, or a portable or mobile indoor/outdoor unit, and may be integrated with an existing air conditioning system and/or a conventional refrigerator, or mounted in a vehicle. The apparatus may also function as a dehumidifier, an air purifier, or a heat pump for cooling or heating air. A compressor, evaporator unit, fan, condenser unit, and a reservoir system that may have separate ambient, cool or warm water compartments are contained within a housing. The primary evaporator and condenser may be coiled and nested together with the condenser disposed in the inner space of the evaporator, allowing greater surface area of both the evaporator and the condenser and increasing the efficiency, moving greater amounts of air and increasing the output of condensation. In some embodiments the compressor, condenser, and water dispenser are remote from the housing. Air is conducted through a filter system and across the evaporator and exhausted across the condenser to clean and cool the air. Condensation from the evaporator is directed to the reservoir system through a filtration system and water seal. A secondary evaporator may be submersed in or around a cool water reservoir for cooling the water and a secondary condenser may be submersed in a warm water reservoir for heating the water or a strip heater may be used. The secondary condenser and secondary evaporator may be connected with a secondary compressor to isolate the refrigeration system for cooling the water from that of condensing the atmospheric moisture.

A control module controls the system operation and may include a microprocessor for assuring maximum condensation and a removable I.C. program module to alter the operation for specific conditions. A humidistat may also be provided to maximize efficiency of atmospheric condensation throughout various time periods and in various climates. The refrigeration system may incorporate singular or multiple components in simultaneous or independent operation.

BRIEF DESCRIPTION OF THE DRAWINGS

FIG. 9A is a cross sectional view showing diagrammatically a modification of the portable wheeled apparatus for extracting potable water from the atmosphere which is provided with fold-out solar cell panels and a DC battery power supply.

FIG. 9B is a side elevation of a modification of the portable wheeled apparatus for extracting potable water from the atmosphere mounted on a trailer chassis and powered by solar cell panels.

DESCRIPTION OF THE PREFERRED EMBODIMENTS

Figure 1:
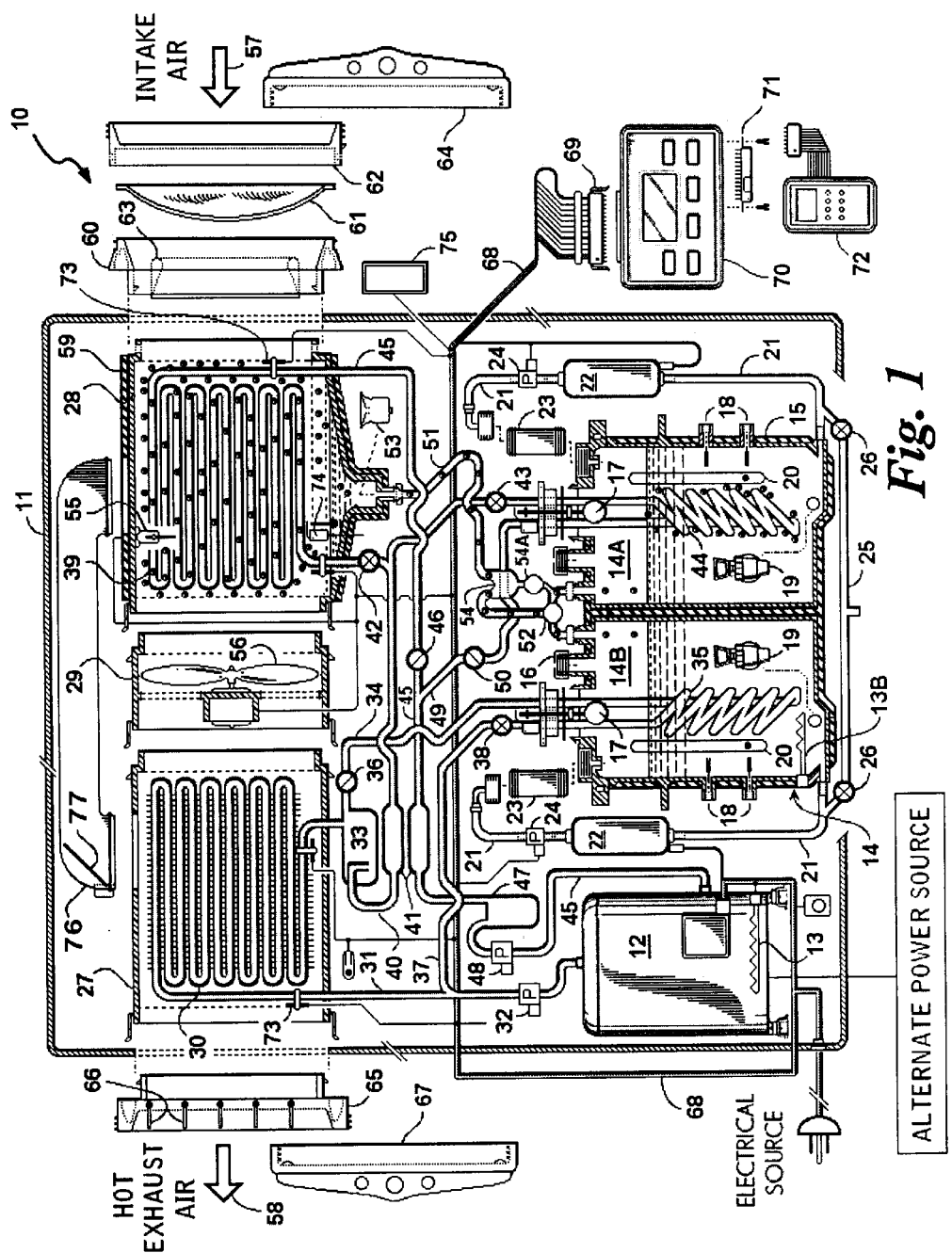
FIG. 1 is a cross sectional view showing diagrammatically an apparatus for extracting potable water from the atmosphere in accordance with the present invention.

Referring to the drawings by numerals of reference, there is shown in FIG. 1, a first embodiment of the water extraction apparatus 10. In the embodiment of FIG. 1, the refrigeration system is shown having single evaporator and condenser units and a dual compartment reservoir, however, it should be understood that the system may incorporate singular or plural elements, and that the physical location of the parts may be rearranged and mounted in, or combined with other stationary or mobile devices, as described hereinafter. It should also be understood that the filters and filtration system for the air and for the condensed potable water may be comprised of various types and combination of filters, such as electrostatic, ozonator, UV treatment, carbon block, and/or granular activated carbon filters. It should also be understood that in some embodiments, the housing of the apparatus or a portion thereof may be used as a duct means.

A refrigeration system operated by a compressor 12 is contained within a compact rigid housing 11 which may be mounted within a window or on a wall. The compressor 12 is preferably powered by a motor provided with a temperature controlled crankcase 13 which may be of the internal heat exchanging tube type, resistance heater, or other conventional temperature control means. In some applications, the compressor 12 may be powered by a power take-off, including belt driven and/or shaft driven means which may include gearboxes and motors. The apparatus may also be powered by DC batteries, fuel cells, solar power, DC batteries supplemented by solar cell panels, or gas powered electrical generators.

A sanitary water reservoir 14 is contained within the housing 11 and, in the illustrated embodiment, is divided into a cold water compartment 14A and a warm water compartment 14B which may be insulated as shown at 15. The reservoir 14 may also be a single compartment or comprise a plurality of reservoirs or holding compartments. The reservoir 14 may also contain access openings 16 with removable caps, and access panels. A water level sensing device 17, such as a float or electronic type, monitors the level of the collected water in each compartment. and the water may also be monitored by temperature sensors 18. Each reservoir compartment may be provided with dispensing valves 19 for removing the water, or the reservoir compartments may be removable in which case water may be simply poured from the compartments. The reservoir water level can be observed by means of a sight glass 20, or other suitable indicator device for each compartment.

Conduit 21 extends from the bottom of each reservoir compartment, through a circulating pump 22 and a replaceable filter 23 and returns to the respective reservoir compartment. A pressure sensing device 24 is located in the conduit 21 at a location where the water stream will increase the circulating pressure upon a resistance in the water filter 23 and turn off the circulating pump 22 to prevent overload or damage. Conduit 25 is connected between the lower ends of conduit 21 near the reservoir outlets and is provided with drain valves 26.

Duct sections 27, 28, and 29 are contained within the housing 11 for conducting atmospheric air through the housing. Duct section 27 contains a primary condenser unit 30 connected at its intake side by conduit 31 to the compressor 12 through a pressure sensing device 32. IThe outlet side of the primary condenser unit 30 is connected to a receiver 33. The inlet of a secondary condenser unit 35 disposed within the warm water compartment 14B of the reservoir 14, is connected to the compressor 12 via solenoid valve 38 and conduit 37, which diverges from conduit 31. The outlet side of the secondary condenser unit 35 is connected by conduit 34 and check valve 36 to the receiver 33.

Duct section 28 contains a primary evaporator unit 39: The receiver 33 is connected to the intake of a secondary evaporator 44 within the cold water compartment 14A of the reservoir 14 via conduit 40 through a filter or dryer 41 and an expansion valve 43, and by a diverging conduit to the intake of the primary evaporator unit 39 through an expansion valve 42. The outlet side of the primary evaporator unit 39 is connected by conduit 45 which extends to the return side of the compressor 12 through a check valve 46, a filter or dryer 41, an optional accumulator 47 and a pressure sensing device 48. The outlet side of the secondary evaporator 44 is connected to the return side of the compressor 12 by conduit 49 through a check valve 50 adjoined to the conduit 45 between the check valve 50 and the dryer 41. In some installations, an air diverter 76 containing a restrictor damper 77 may be connected in communication between the condenser unit 30 and the evaporator unit 39 whereby exhausted heat is bypassed back to the evaporator 39 to prevent freezing and assist in maximizing condensation.

The bottom portion of the duct section 28 is tapered to collect condensation and is connected to the reservoir 14 by conduit 51 which extends downwardly and diverges through a directional valve 52 to be directed either into the cold water compartment 14A or warm water compartment 14B of the reservoir 14. A replaceable filter 53 is installed at, or below the tapered bottom portion of the duct section 28 to filter the condensation. The filter 53 may be a "snap-in" type, or other suitable filter means, and can be changed by removing an access door on the duct or housing.

A water seal 54, or other suitable device, is installed in the conduit 51 and connected through a drain valve 54A to the directional valve 52 to aid in isolating incoming environmental elements and the ambient air temperature from the reservoir 14. The water seal 54 may also be temperature controlled to extract or inject heat from or into the internal water content of the seal to provide a more consistent temperature in the reservoir. An air flow sensing device 55, which may be of a flag switch type, may be located within the duct section 28, as well as a temperature sensor 74 and a water level sensor 74.

Duct section 29 is disposed between duct sections 27 and 28 and contains a motorized blower or fan 56. As explained hereinafter, the fan 56 draws ambient air, represented by arrow 57 from the atmosphere through the duct 28 and the outgoing air, represented by arrow 58 is exhausted through the duct 27. The duct element 28 may be insulated as represented at 59 so as to minimize the exchanging of temperature between the duct section and the incoming atmospheric air stream 57, in addition to minimizing the exchange of the temperature between the duct section and the evaporator unit 39.

An air intake ring 60, which may be integrated into the housing, is mounted at the intake end of the duct 28 and receives a replaceable air filter 61 which is maintained thereon by a retainer ring 62, or other suitable means. An air intake stabilizer 63 may optionally be located within the air intake ring 60 to enhance efficiency. The air intake stabilizer 63 is configured to aerodynamically pass the incoming atmospheric air stream 57 through the duct sections and provide a stable air flow rate. As described hereinafter, the air intake means may also be integrated into the housing. The air filter 61 is constructed of a suitable non-absorbent material to trap particles of dirt and/or other undesirable elements. An optional removable cap or cover 64 may be used to cover the filter 61 in hostile conditions or environments.

An exhaust ring 65, or other suitable exhaust means, which may be integrated into the housing, is mounted at the discharge end of the duct 27 and preferably has a plurality of lightweight louvers or shutters 66 pivotally mounted thereon which may be closed by gravity or other means conventional in the art. The shutters 66 help to keep out undesirable environmental elements when the system is in a non-operating state. Screens and housing sealants may also be used for this purpose. An optional removable cap or cover 67 may be used to cover the exhaust opening in hostile conditions or environments.

The system is powered by an electrical source and electrical current is supplied to the components by a wiring harness 68 having a plurality of electrical conductors and modular plug connectors 69 for fast economical assembly and repair. It should be understood that, in some applications, the compressor 12 may be powered by power take-off means, such as belt driven and/or shaft driven means which may include gearboxes and motors. The apparatus may also be powered by group consisting of alternating current, DC batteries, fuel cells, solar power, DC batteries supplemented by solar cell panels, or gas powered electrical generators.

The operation of the system is controlled by a control module 70 which may contain switches and buttons necessary for operation of the system, and LED or LCD indicators and displays. Control module 70 may also contain a microprocessor for assuring maximum condensation. in addition to a removable program module 71, or pre-programmed I.C. chip, which may be plugged into the control module to alter operation for specific conditions. The control module 70, may also contain an auxiliary power supply battery for retaining information in the event of electrical failure. The insertable program module 71 provides maximum operation for a specific geographical location and allows the system to immediately adapt to new environmental conditions when necessary. A diagnostic test unit 72 may be provided which will plug into the control module 70 for trouble-shooting and repair of the system.

A humidistat 75 may be provided to maximize efficiency of atmospheric condensation throughout various times of day or night while in a manual or an automatic operating state. The humidistat 75 is monitored by the control module microprocessor and referenced with program module 71. This feature enhances water collection in desert climates, under varied conditions.

Figure 2:
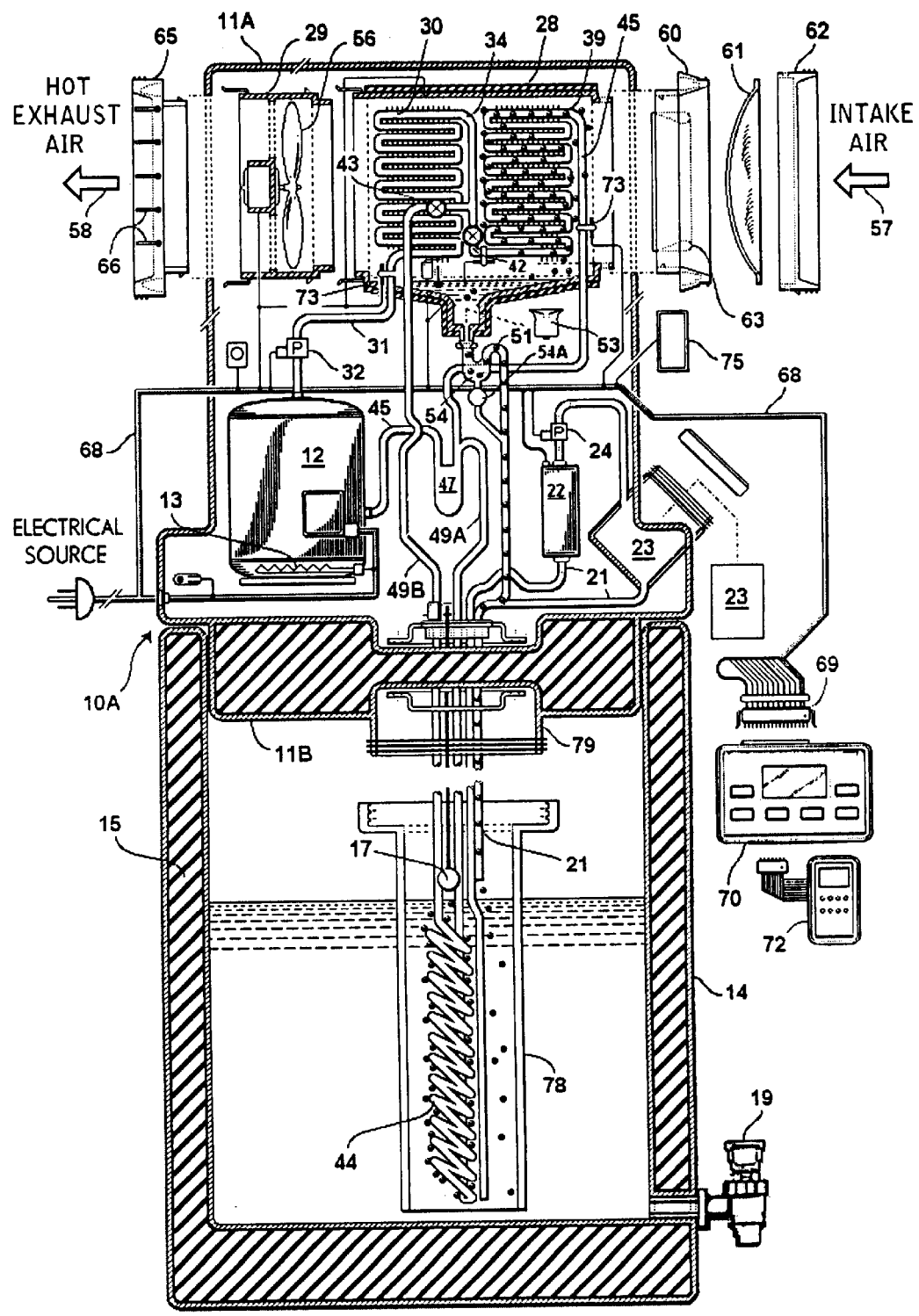
FIG. 2 is a cross sectional view showing diagrammatically a portable embodiment of the apparatus for extracting potable water from the atmosphere in accordance with the present invention.

FIG. 2 illustrates an alternate embodiment 10A of the water extraction system, which has an upper housing that is removably received and installed on a lower reservoir. Many of the components previously described with reference to FIG. 1 are given the same numerals of reference, however, the detailed description of all the same components will not be repeated again here, to avoid repetition.

As previously described, a refrigeration system operated by a compressor 12, preferably having a temperature controlled crankcase 13, is contained within a compact rigid housing 11A having a bottom portion 11B which is configured to be received in the top end of a hollow container or reservoir 14. The water reservoir 14 has a single water compartment, a dispensing valve 19, and contains a water level sensing device 17. The reservoir 14 may also be insulated as indicated at 15.

Conduit 21 extends upwardly from the reservoir compartment through the bottom portion 11B of the housing 11A through a circulating pump 22 and a replaceable filter 23 and returns to the reservoir compartment. A pressure sensing device 24 is located in the conduit 21 at a location where the water stream will increase the circulating pressure upon a resistance in the water filter 23 and turn off the circulating pump 22 to prevent overload or damage.

An evaporator guard 78 may be removably connected by a connector 79 to the bottom portion 11B of the housing 11A which extends downwardly into the reservoir and surrounds the secondary evaporator unit and conduit 21 for protecting the evaporator and conduit units when the apparatus is opened.

Duct sections 28 and 29 are contained within the housing 11A for conducting atmospheric air through the housing.

Duct section 29 contains a motorized blower or fan 56. As explained hereinafter, the fan 56 draws ambient air, represented by arrow 57 from the atmosphere through the duct 28 and the outgoing air, represented by arrow 58 is exhausted through the duct 28.

Duct section 28 contains a primary condenser unit 30 and a primary evaporator unit 39. The primary condenser unit 30 is connected at its intake side by conduit 31 to the compressor 12 through a pressure sensing device 32. The outlet side of the primary condenser unit 30 is connected by conduit 34 through expansion valve 42 to the intake of the primary evaporator 39, and through expansion valve 43 to the intake of a secondary evaporator unit 44 disposed in the reservoir 14. The outlet side of the evaporator unit 39 is connected by conduit 45 to the return side of the compressor 12 through an accumulator 47. The inlet side of the secondary evaporator unit 44 in the reservoir 14 is connected by conduit 49B to the compressor 12 via conduit 45 and expansion valve 43. The outlet side of the secondary evaporator 44 is joined to the return side of the compressor 12 by conduit 49A accumulator 47 and conduit 45.

The bottom portion of the duct section 28 is tapered to collect-condensation and is connected to the reservoir compartment 14 by conduit 51 which extends downwardly and joins conduit 21 below the filter 23 to extend into the reservoir 14. A replaceable filter 53 is installed at the tapered bottom portion of the duct section 28 to filter the condensation. The filter 53 may be a "ssnap-in" type, or other filter means, and may be changed or serviced by removing an access door on the duct or housing.

A water seal 54 is installed in the conduit 51 and connected through a drain valve 54A back into the conduit 51. The water seal 54 aids in isolating the incoming environmental elements and the ambient air temperature from the reservoir 14, and may also be temperature controlled to extract or inject heat from or into the internal water content of the seal to provide a more consistent temperature in the reservoir.

As previously described and shown in FIG. 1, an air flow sensing device 55, temperature sensor 73, and level sensor 74 are located within the duct section 28. These components are not labeled with a reference numeral, because of limited space in the drawing figure, but may be seen in FIG. 1.

The duct section 28 may be insulated as represented at 59 so as to minimize the exchanging of temperature between the duct section and the incoming atmospheric air stream 57, in addition to minimizing the exchange of the temperature between the duct section and the evaporator unit 39.

An air intake ring 60 is mounted at the intake end of the duct 28 and receives a replaceable air filter 61which is maintained thereon by a retainer ring 62. An air intake stabilizer 63 may optionally be located within the air intake ring 60 to enhance efficiency. The air intake stabilizer 63 is configured to aerodynamically pass the incoming atmospheric air stream 57 through the duct sections and provide a stable airflow rate. The air filter 61 is constructed of a suitable non-absorbent material to trap particles of dirt and/or other undesirable elements. An optional removable cap or cover 64 may be used to cover the filter 61 in hostile conditions or environments.

An exhaust ring 65 is mounted at the discharge end of the duct 29 and preferably has a plurality of lightweight louvers or shutters 66 pivotally mounted thereon which may be closed by gravity or other means conventional in the art. The shutters 66 help to keep out undesirable environmental elements when the system is in a non-operating state. An optional removable cap or cover 67 may be used to cover the exhaust ring 65 in hostile conditions or environments.

The system is powered by an electrical source and electrical current is supplied to the components by a wiring harness 68 having a plurality of electrical conductors and modular plug connectors 69 for fast economical assembly and repair.

The operation of the system is controlled by a control module 70 which may contain switches, buttons, indicators, and displays necessary for operation of the system. Control module 70 may also contain a microprocessor for assuring maximum condensation, in addition to a removable program module 71, or pre-programmed I.C. chip, which may be plugged into the control module to alter operation for specific conditions. The control module 70 may also contain an auxiliary power supply battery for retaining information in the event of electrical failure. The insertable program module 71 provides maximum operation for a specific geographical location and allows the system to immediately adapt to new environmental conditions when necessary. A diagnostic test unit may be provided which will plug into the control module 70 for trouble-shooting and repair of the system.

A humidistat 75 may be provided to maximize efficiency of atmospheric condensation throughout various times of day or night while in a manual or an automatic operating state. The humidistat 75 is monitored by the control module microprocessor and referenced with program module 71.

Figure 3:
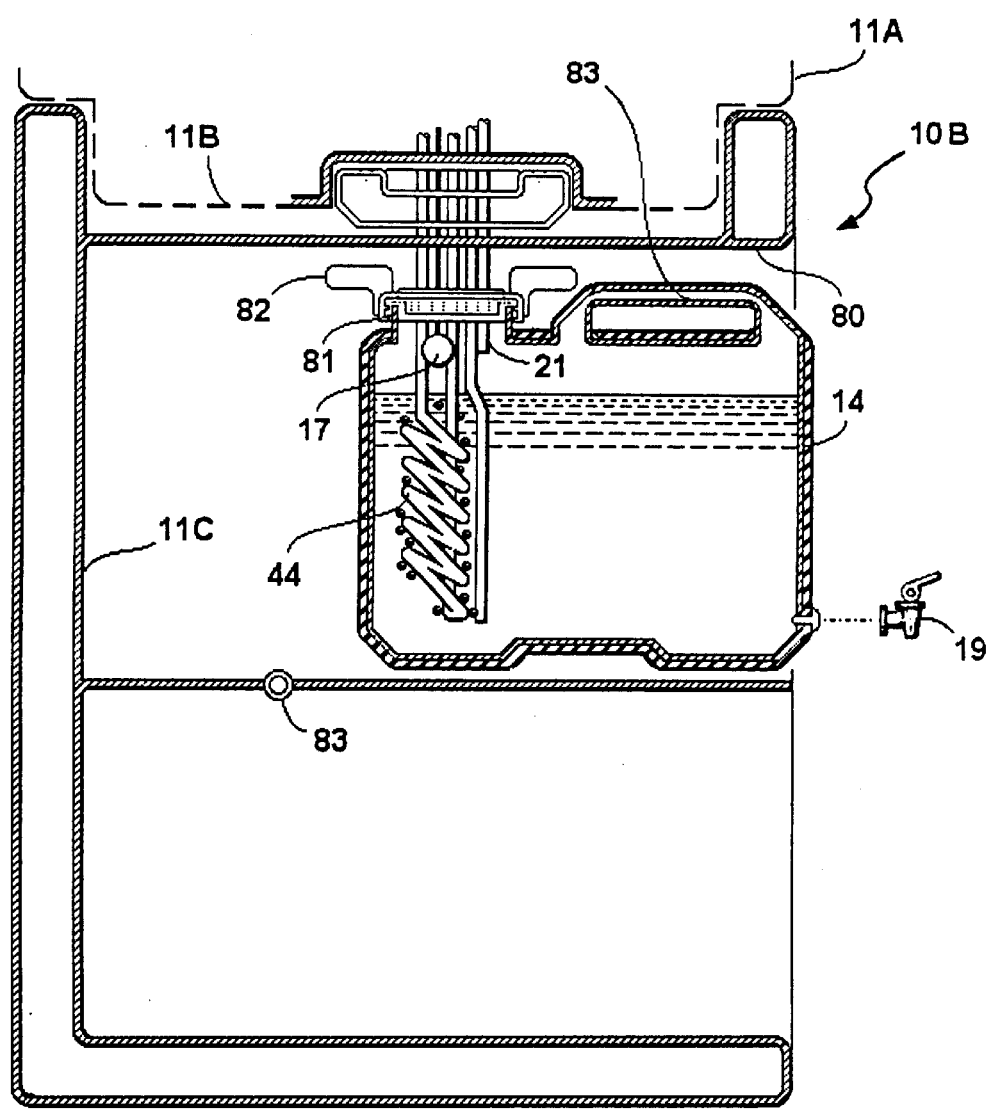
FIG. 3 is a cross sectional view of a modified reservoir arrangement utilized in combination with the embodiment of FIG. 2, the bottom portion of the upper housing being represented by dashed line.

Another modification 10B of the water extraction system is shown in FIG. 3 that utilizes a stand or lower housing 11C, which may be used in combination with the upper housing 11A of the embodiment of FIG. 2. The bottom portion 11B of the upper housing 11A of the embodiment of FIG. 2 is represented by dotted line.

The embodiment of FIG. 3 utilizes a plurality of removable containers or reservoirs 14 which are removably received in an opening 80 in the housing 11C. The removable containers or reservoirs 14 preferably have a wide mouth opening 81 through which the secondary evaporator 44 and conduit 21 is inserted. A water level sensing device 17, such as a float or electronic type, monitors the level of the collected water in each reservoir or container. A lock ring 82 at the upper end of the opening retains the removable reservoirs 14 during the filling operation. The bottom wall of the housing opening 80 may be hinged at 83 to facilitate installing the removable reservoirs 14 onto the secondary evaporator 44 and conduit 21. The containers or reservoirs 14 may have built in handles 83 to facilitate easy installation, removal and transporting.

It should be understood that in the various embodiments described herein that the incoming and exhausted air vents and directional means may be integrated into and within the housing to maximize the condensation and proper flow of the air. It should also be understood that the basic physical arrangement of the various components described above may be physically rearranged and/or integrated within one another.

Indoor Units

Figure 4:
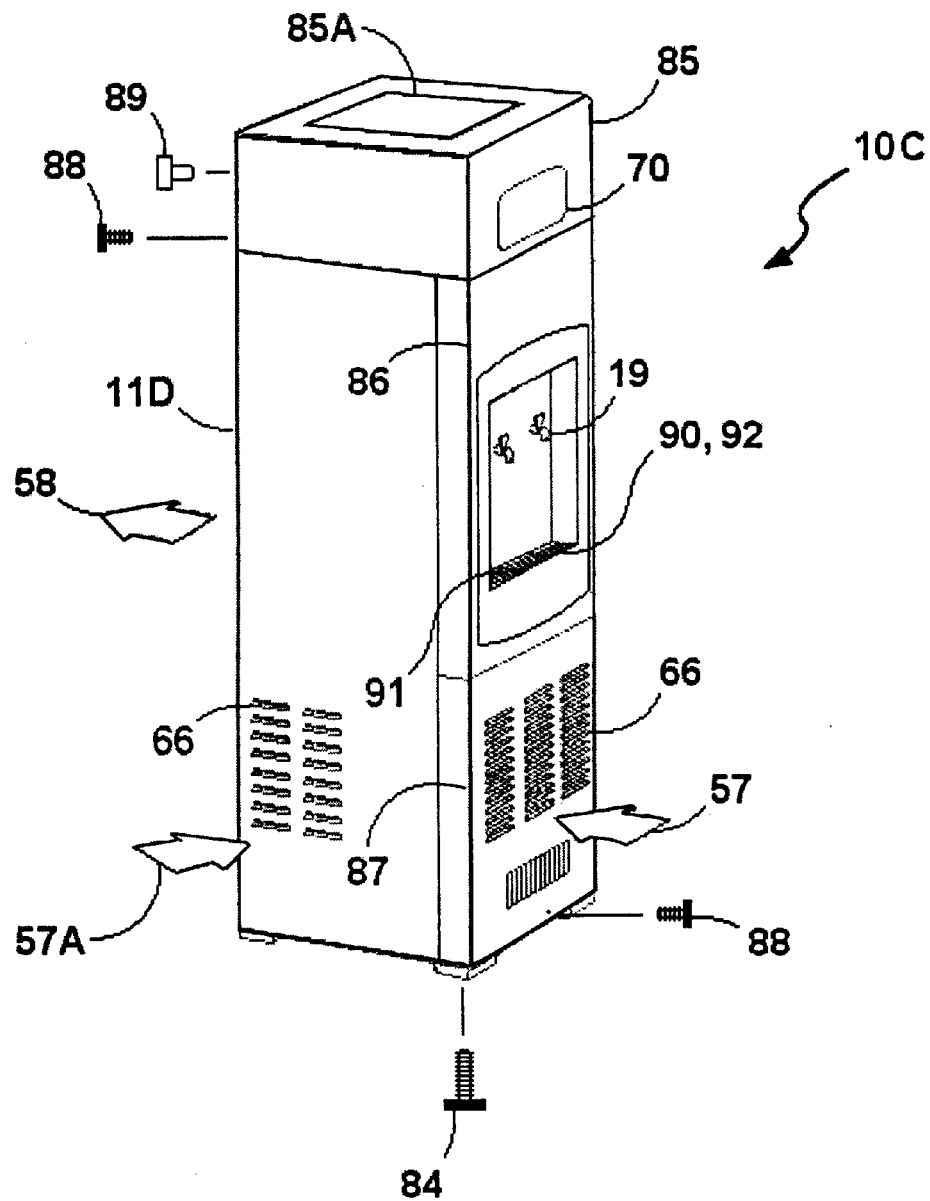
FIG. 4 is a perspective view of a portable freestanding apparatus for extracting potable water from the atmosphere in accordance with the present invention.
Figure 4A:
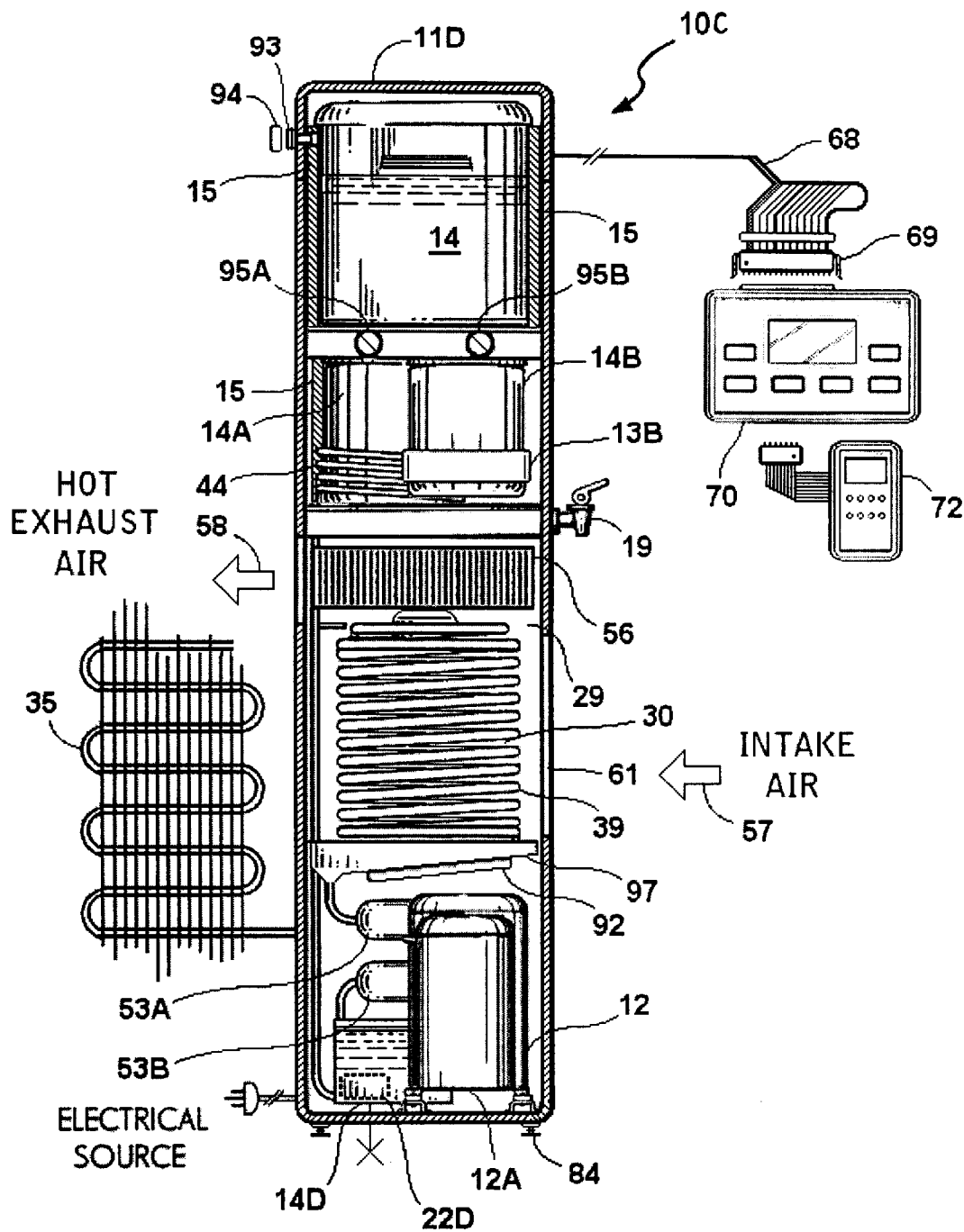
FIG. 4A is a cross sectional view showing diagrammatically the embodiment of FIG. 4.
Figure 4B:
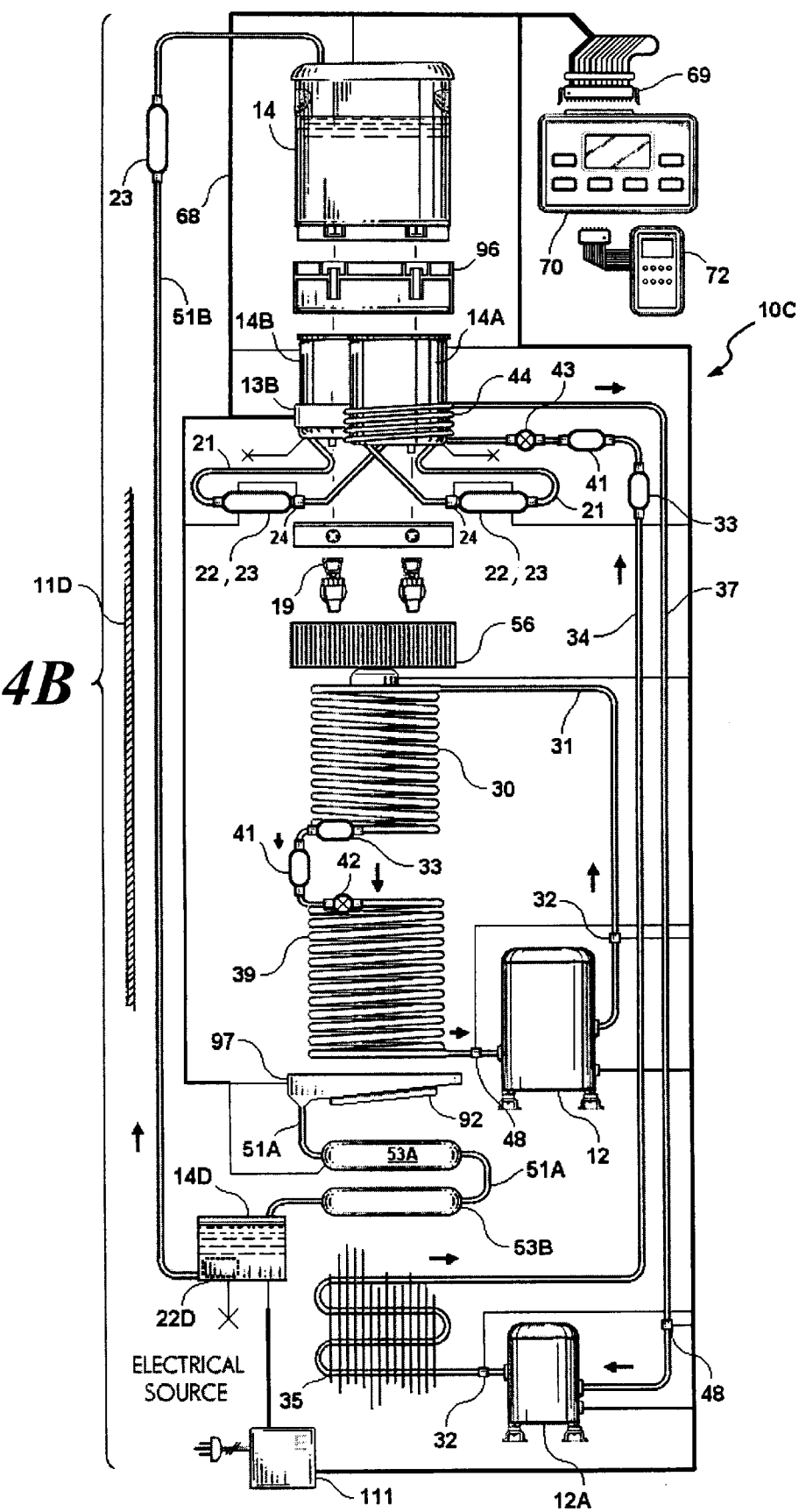
FIG. 4B is a schematic diagram showing the interconnection of the components of FIGS. 4 and 4A in greater detail.

Referring now to FIGS. 4, 4A and 4B, there is shown a portable freestanding embodiment 10C for extracting potable water from the atmosphere, which may be placed inside a home. office or other building. Many of the system components previously described above are given the same numerals of reference, however, the detailed description of all the same components will not be repeated again here, to avoid repetition.

In this embodiment, the components of the refrigeration system are contained within a freestanding compact rigid housing 11D which may provided with adjustable leveling pads 84 on its bottom or base to help minimize sound and vibration in addition to leveling the unit on an unstable floor, or raising the apparatus to a convenient comfortable level. The housing 11D has a top cover 85, a front cover 86, and an air intake panel 87 which are removable for easy access for changing filters and periodic maintenance and are secured by thumbscrews 88. The intake panel 87 and the lateral side panels of the housing each have a plurality of louvers 66 therein to aerodynamically pass the incoming atmospheric air stream 57 through the housing and provide a stable air flow rate. Outgoing air, represented by arrow 58 is exhausted through louvers in the back of the housing. Removable air filters (not shown) are installed inside the housing in the incoming air streams and may also be installed in the exhaust air stream. The operation of the system is controlled by a control module 70 (described previously) which may be mounted on the front of the housing 11D, or other convenient location.

The top cover 85 of the housing may have a convenience area 85A either inset or raised on its top surface for accessories, and may have a hose connection 89 on its back side for connecting a hose. A removable drip tray 90 and a removable grid 91 are disposed in an alcove on the front of the housing 11D beneath the dispensing valves 19. The drip tray 90 may be provided with a strip heater 92 or other means for drying drips, spills or moisture.

Referring now to FIGS. 4A and 4B, a first compressor 12 is contained within the housing 11D and is preferably powered by. a motor which may have a temperature controlled crankcase (described previously), or other conventional temperature control means. Electrical current is supplied to the components by a wiring harness 68 having a plurality of electrical conductors and may have modular plug connectors 69 for fast economical assembly and repair. In some applications, the compressor 12 may be powered by a power take-off, which may also be of a belt driven or shaft driven means, including gearboxes and motors.

In this embodiment, a larger ambient water reservoir 14, a smaller cold water reservoir 14A and a smaller warm or hot water reservoir 14B are contained within the housing 11D. The reservoirs 14 and 14B may be insulated and reservoir 14B is provided with an internal heat exchanging tube type resistance strip heater 13B or other heating means. It should be understood that the reservoirs may be a single structure which is divided into an ambient water compartment, a cold water holding compartment, and a warm or hot water holding compartment. This arrangement allows a greater supply of cold water and hot water upon demand with the majority of the ambient water supplying both smaller reservoirs automatically and apportioning the correct balance by gravity, upon the dispensing of water. The reservoir 14 may be provided with a hose connection 93 that extends through the back of the housing with a removable cap 94 to facilitate cleaning and adding water in a controlled way, and to assist in troubleshooting and repair of the system.

The reservoirs 14, 14A, and 14B may also include built-in handles, and contain access openings with removable caps, covers or other closure means, a water level sensing device. such as a float or electronic type, to monitor the level of the collected water in each compartment. and the water may be monitored by temperature sensors, as shown and described previously. The reservoirs may also contain access means and check valves to facilitate easy installation, removal and cleaning. Water is supplied from reservoir 14 to 14A and also from 14 to 14B with separate conduits to each so that the main water compartment replenishes each of the heated and cooled water compartments automatically upon dispensing of water. The reservoirs 14A and 14B may also have check valves 95A and 95B in the conduits that supply them from reservoir 14 to assure positive flow and no mixing of temperatures. As seen in FIG. 4B, a reservoir receiving tray 96 may be installed beneath the reservoir 14 which is configured to interlock with the check valves of the reservoirs 14A and 14B when installed and place them in an open position for use. Each of the reservoirs 14A and 14B is vented to allow proper flow and is provided with a dispensing valve 19 for removing the water which may flow by gravity or be pressurized, or the reservoir compartments may be removable in which case water may be simply poured from the reservoirs. The dispensing valves 19 are preferably of a safety type to prevent injury to children. The reservoir water level can be observed by means of a sight glass (shown and described previously with reference to FIG. 1), or other suitable indicator device including integration into the controls or convenience group for each compartment.

As seen in FIG. 4B, a conduit 21 extends from the bottom of each reservoir 14A, 14B, through a circulating pump 22 and replaceable filter 23, respectively, and returns to the respective reservoir. A pressure sensing device 24 is located in the conduit 21 at a location where the water stream will increase the circulating pressure upon a resistance in the water filter 23 and turn off the circulating pump 22 to prevent overload or damage. Conduit or other suitable drain means may be connected to the bottom of the reservoirs for draining (shown and described previously).

In the embodiment of FIGS. 4, 4A and 4B, the housing 11D contains a coiled condenser unit 30 which is coiled, preferably vertically, and inserted within the inside of evaporator 39 which may also be coiled, preferably vertically, but in opposed relation to condenser 30. The condenser unit 30 is connected at its intake side by conduit 31 to the compressor 12 through a pressure sensing device 32. The outlet side of the condenser unit 30 is connected to a receiver 33 and through a filter or dryer 41 and through expansion valve 42 to the intake of evaporator unit 39. The outlet side of the evaporator unit 39 is connected to the return side of the compressor 12 through a pressure sensor 48.

Condensation is collected in a tapered-bottom collecting tray 97 disposed beneath the evaporator and condenser which is connected by conduit 51A to a fourth reservoir 14D through replaceable filter means 53A and 53B. The collecting tray 97 may be provided with a strip heater 92 or other means for drying any drips, spills, or moisture when the unit is not operating. Conduit 51B extends upwardly from reservoir 14D into reservoir 14. Water is pumped through conduit 51B by pump 22D which preferably allows the conduit 51B to drain into reservoir 14D when not operating to assure clean and fresh water. Pump 22D is positioned to allow all water to be removed from the reservoir 14D and the reservoir is fitted with a drain. Pump 22D may be integrated into reservoir 14D allowing the reservoir to fill to water level sensor in the reservoir and then pump the condensed water to reservoir 14, to prevent pump 22D from cycling erratically, prolonging the life of the pump and smoothing out operation of the unit. Water from reservoir 14 will feed by gravity into cool water compartment 14A and/or warm water compartment 14B.

Duct section 29 contained within, or integrated with the housing 11D contains a motorized fan or squirrel cage blower 56. A heat strip may also be provided in this section to preheat incoming air. The fan or blower 56 draws ambient air, represented by arrow 57 from the atmosphere through the front of the housing and optionally from the two sides, and the outgoing air, represented by arrow 58 is exhausted through the back of the housing. It should be understood that a secondary fan may also be used to move air across the evaporator and heat strip so as to prevent icing and maximize condensation.

In the embodiment of FIGS. 4, 4A and 4B, a secondary condenser unit 35, secondary evaporator 44 and secondary compressor 12A are provided as a secondary refrigeration means to isolate the refrigeration means for cooling the water from that of condensing the atmospheric moisture. In this arrangement, the secondary condenser 35 is disposed in the exhaust air stream on the back of the housing and its intake side is connected to the secondary compressor 12A through a pressure sensing device 32. The secondary evaporator 44 is disposed within or around the exterior of the reservoir 14A in a heat exchanging relationship to cool the water therein. The outlet side of the secondary condenser unit 35 is connected by conduit 34 to a receiver 33 and through a filter or dryer 41 and through expansion valve 43 to the intake of the secondary evaporator unit 44. The outlet side of the evaporator unit 44 is connected by conduit 37 to the return side of the compressor 12 through a pressure sensor 48. The secondary condenser 35 may be used to preheat the warmed water. An internal resistance heater may also be used for heating water and the secondary condenser 35 may be installed on the inside or the outside of the housing to allow for a compact and efficient design.

As with the previously described embodiment, a control module 70 which may contain switches, buttons, indicators, and displays controls the operation of the system. Control module 70 may also contain a microprocessor for assuring maximum condensation, in addition to a removable program module 71, or pre-programmed IC chip, which may be plugged into the control module to alter operation for specific conditions. The control module 70 may also contain an auxiliary power supply battery for retaining information in the event of electrical failure. The insertable program module 71 provides maximum operation for a specific geographical location and allows the system to immediately adapt to new environmental conditions when necessary. An optional diagnostic test unit 72 may be provided which will plug into the control module 70 for trouble-shooting and repair of the system. A humidistat monitored by the control module may be provided to maximize efficiency of atmospheric condensation throughout various times of day or night while in a manual or an automatic operating state. This feature enhances water collection in desert climates, under varied conditions.

Also as described in the previous embodiment, water seals may be provided in the conduit connected with the reservoirs to isolate the incoming environmental elements and the ambient air temperature from the reservoirs.

Figure 4C:
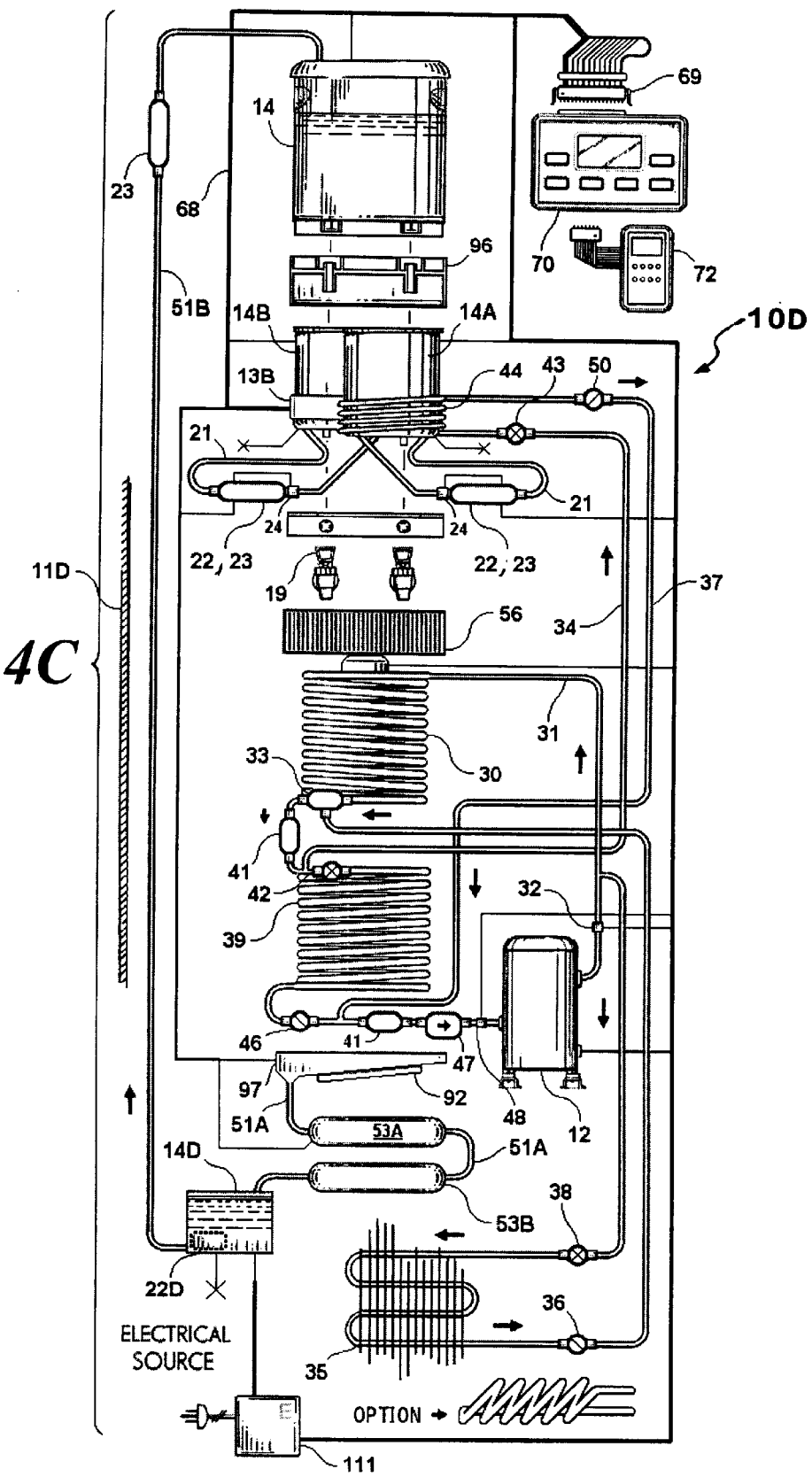
FIG. 4C is a schematic diagram showing a single compressor embodiment with the same components of FIG. 1 as they would be arranged in an upright freestanding unit.

FIG. 4C is a schematic diagram similar to FIG. 4B showing a single compressor embodiment 10D with the same components of FIG. 1 as they would be arranged in an upright freestanding housing 11D. The system components previously described with reference to FIG. 1 are given the same numerals of reference, however, the detailed description of all the same components will not be repeated, to avoid repetition. It should also be understood that the components of the single compressor embodiment of FIGS. 1 and 4C may be housed within the housing 11D.

Figure 4D:
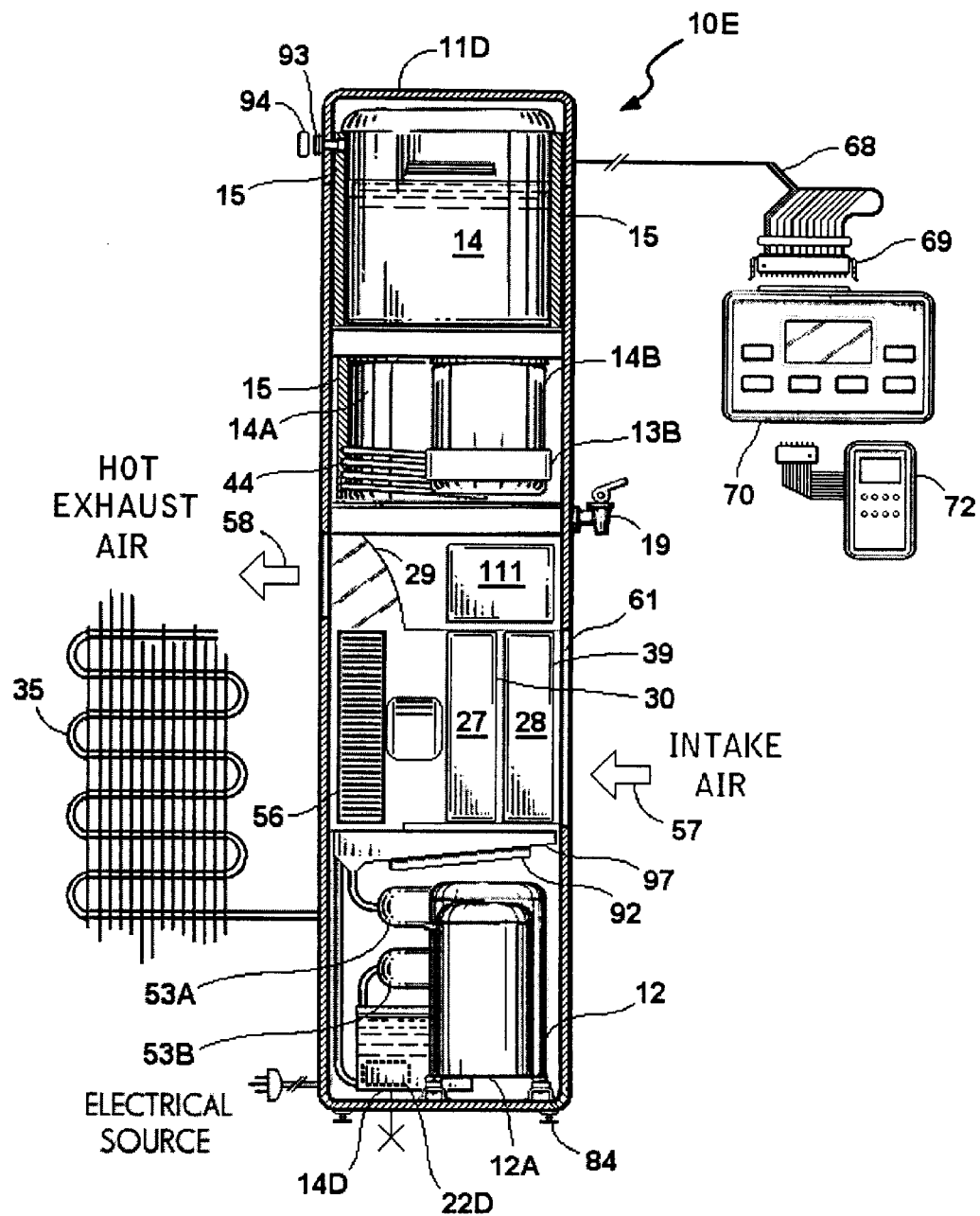
FIG. 4D is a cross sectional view showing diagrammatically a modification of the portable freestanding apparatus for extracting potable water from the atmosphere, with the components arranged differently.

Referring now to FIG. 4D, there is shown a modification 10E of the portable freestanding embodiment for extracting potable water from the atmosphere. In this embodiment, the components of the refrigeration system are also contained within a freestanding compact rigid housing 11D but are arranged somewhat different from the embodiment of FIGS. 4, 4A and 4B. The system components are the same and are interconnected in the same way as previously described above with reference to FIGS. 4, 4A, and 4B, however, the detailed description and of all the same components and their conduits and interconnections will not be repeated again here, to avoid repetition.

In this arrangement a larger ambient water reservoir 14 which may be insulated as represented by 15, a smaller cold water reservoir 14A and a smaller warm or hot water reservoir 14B are contained within the upper portion of the housing 11D. The reservoir 14 may be provided with a hose connection 93 that extends through the back of the housing with a removable cap 94 to facilitate cleaning and adding water, and to assist in troubleshooting and repair of the system. The reservoir 14B is insulated and provided with an internal heat exchanging tube type resistance strip heater 13B or other heating means.

In the embodiment of FIG. 4D, the secondary condenser unit 35, secondary evaporator 44 and secondary compressor 12A are provided as a secondary refrigeration means to isolate the refrigeration means for cooling the water from that of condensing the atmospheric moisture. The secondary condenser 35 is disposed in the exhaust air stream on the back of the housing with its intake side is connected to the secondary compressor 12A through a pressure sensing device, and the secondary evaporator 44 is disposed within or around the exterior of the reservoir 14A in a heat exchanging relationship to cool the water therein with its intake connected to the secondary condenser 35 and its outlet side connected to the return side of the compressor 12A.

Duct section 29 is contained within the rear portion of the housing 11D and duct sections 27 and 28 are contained adjacent to each other within front portion of the housing for conducting atmospheric air through the housing. Duct section 27 contains the primary condenser unit 30, and duct section 28 contains the primary evaporator unit 39, which in this embodiment are of a serpentine coil configuration, as shown in FIGS. 1 and 2, rather than the nested helical coiled configuration. Duct section 29 contains the motorized blower or fan 56, which draws ambient air, represented by arrow 57, from the atmosphere through a replaceable air filter 61, the evaporator unit 39 in duct 28, the condenser unit 30 in duct 27, and the outgoing air, represented by arrow 58 is exhausted through the duct 27 and across the secondary condenser unit 35. A removable air filter (not shown) may also be installed inside the housing in the exhaust air stream. An electrical connection box 111 for miscellaneous electrical controls may be mounted inside the housing. A heat strip may also be disposed in the ducts to heat incoming air.

Figure 4E:
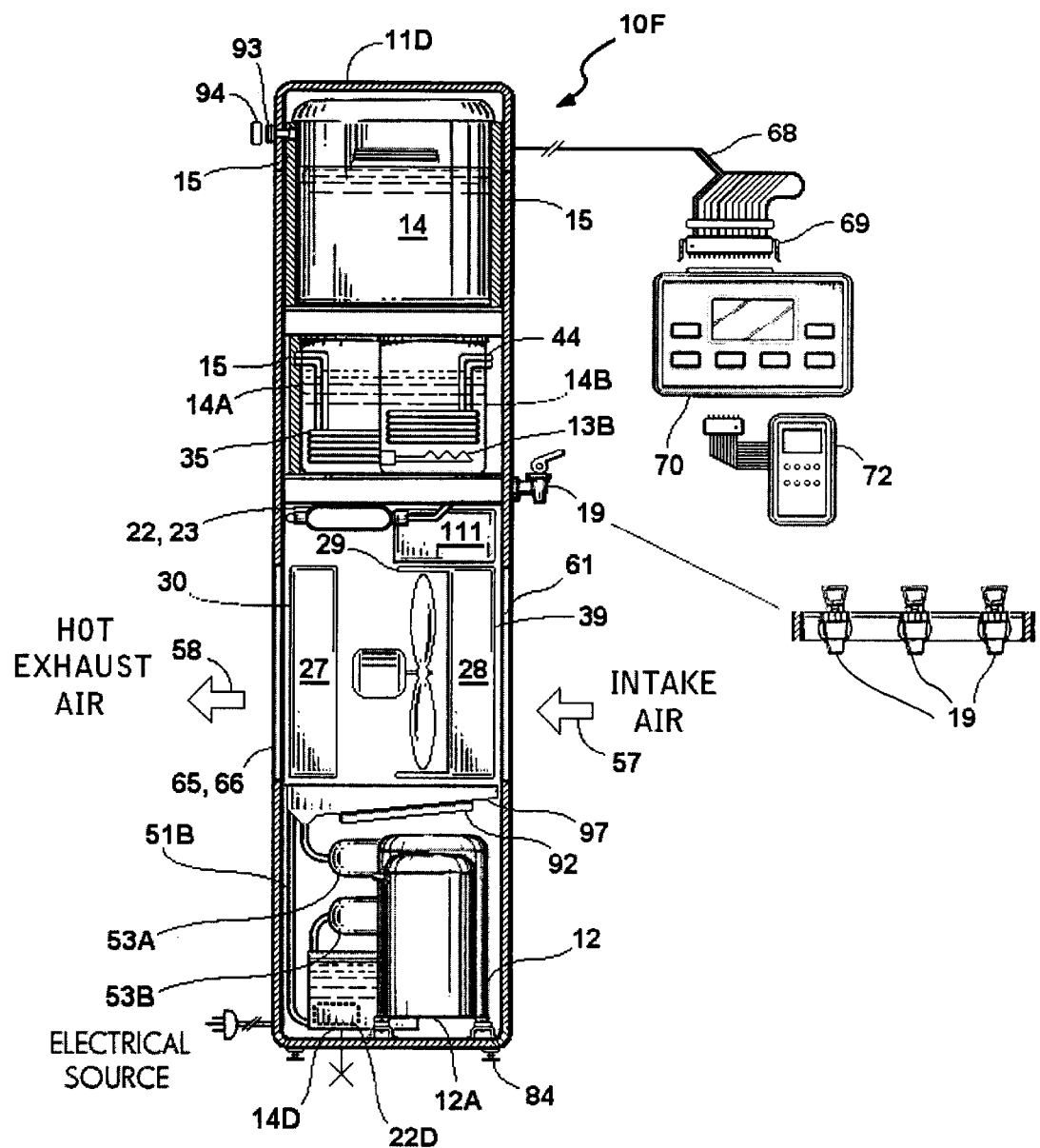
FIG. 4E is a cross sectional view showing diagrammatically another modification of the portable free standing apparatus for extracting potable water from the atmosphere. with the components arranged differently.

Referring now to FIG. 4E, there is shown another modification 10F of the portable freestanding embodiment for extracting potable water from the atmosphere. Many of the system components previously described above are given the same numerals of reference. however, the detailed description of all the same components will not be repeated again here, to avoid repetition. In this embodiment, the components of the refrigeration system are contained within a freestanding compact rigid housing 11D but are arranged somewhat different from the embodiment of FIGS. 4A and 4D.

In this arrangement, the reservoir at the upper end of the housing is divided into a cold water reservoir compartment 14A and a warm or hot water reservoir compartment 14B, which are insulated as indicated at 15. The secondary evaporator 44 is disposed in or around the cold water reservoir compartment 14A, and the secondary condenser unit 35 is disposed in or around the warm water compartment 14B.

Duct section 27 is contained within the rear portion of the housing 11D and duct sections 28 and 29 are contained within front portion of the housing for conducting atmospheric air through the housing. Duct section 27 contains the primary condenser unit 30, and duct section 28 contains the primary evaporator unit 39, which in this embodiment are of a serpentine coil configuration, as shown in FIGS. 1 and 2, rather than the nested helical coiled configuration. Duct section 29 contains the motorized blower or fan 56, which draws ambient air, represented by arrow 57 from the atmosphere through a replaceable air filter 61 and the evaporator unit 39 in duct 28, and the outgoing air, represented by arrow 58 is exhausted through the condenser unit 30 in duct 27 and through exhaust louvers or shutters 66 on the back of the housing. A removable air filter (not shown) may also be installed inside the housing in the exhaust air stream. An electrical connection box 111 for miscellaneous electrical controls may be mounted inside the housing. A heat strip may also be disposed in the ducts to heat incoming air.

Referring again additionally to FIG. 4B, in the embodiments of FIGS. 4D and 4E, the intake side of the primary condenser unit 30 is connected by conduit 31 to the first compressor 12 through a pressure sensing device 32. The outlet side of the primary condenser unit 30 is connected to the inlet side of the evaporator 39 through the receiver 33, through filter or dryer 41, and expansion valve 42. The outlet side of the evaporator 39 is connected to the return side of the compressor 12 through pressure sensing device 48. The intake side of the secondary condenser 35 is connected to the secondary compressor 12A through a pressure sensing device 32. The outlet side of the secondary condenser unit 35 is connected to the intake of the secondary evaporator unit 44 within, or around, the cold water reservoir compartment 14A through conduit 34 receiver 33, the filter or dryer 41, and expansion valve 43. The outlet side of the secondary evaporator unit 44 is connected by conduit 37 to the return side of the compressor 12 through a pressure sensor 48. The secondary condenser 35 may be used to preheat the warmed water, or may be disposed within or on the back of the housing.

Condensation is collected in collection tray 97, which may be combined with duct section 28. Collection tray 97 is connected through a replaceable filter 53 to a third reservoir 14D. Reservoir 14D is connected to the reservoir compartment 14A by conduit 51B through an optional replaceable filter 23 and water is pumped through conduit 51B by pump 22D which preferably allows the conduit to drain into reservoir 14D when not operating to assure clean and fresh water. Pump 22D may be integrated into reservoir 14D allowing the reservoir to fill to a water level sensor in the reservoir and then pump the condensed water, preventing the pump from cycling erratically.

As with the previously described embodiments, the secondary condenser unit 35, secondary evaporator 44 and secondary compressor 12A provide a secondary refrigeration means to isolate the refrigeration means for cooling the water from that of condensing the atmospheric moisture. It should be understood that, alternatively, the components of the single compressor embodiment of FIGS. 1 and 4C may be housed within the housing 11D.

The freestanding embodiments described above, which may be placed inside a home, office or other building provide filtered ambient, chilled, and heated potable water from the atmosphere. When operated in the home, office or other building, the apparatus may also function as an air purifier and/or a dehumidifier. The hot air exhaust, which is a byproduct of the condensation process, may also be used as a source of heat. It should be understood that, alternatively, the apparatus may be mounted on a wall rather than supported on the floor.

Hybrid Window or Wall Mounted Unit

Figure 5:
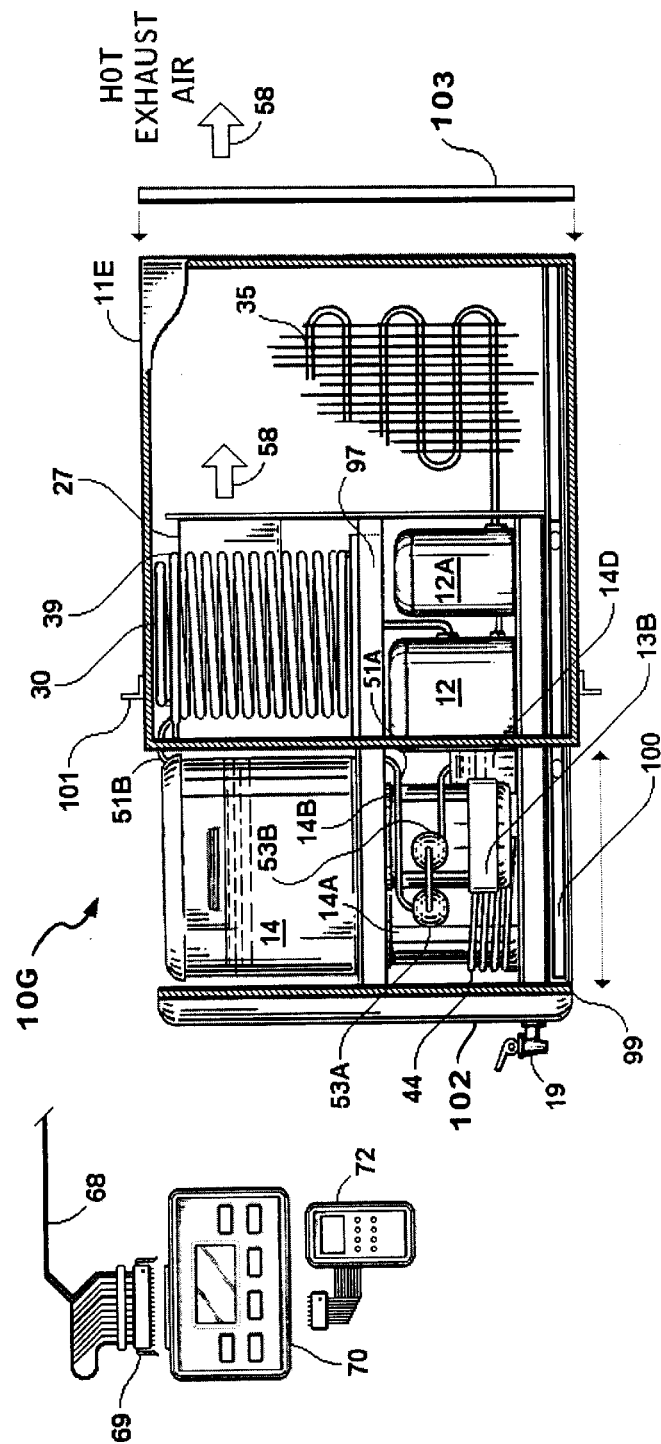
FIG. 5 is a cross sectional view showing diagrammatically a window or wall mounted apparatus for extracting potable water from the atmosphere or as a combination air conditioning system and apparatus for extracting potable water from the atmosphere.

Referring now to FIG. 5, there is shown an embodiment 10G which is adapted to be mounted in a window opening or wall of a building and functions as an apparatus for extracting potable water or a combination air conditioning unit and apparatus for extracting potable water. The components previously shown and described with reference to FIGS. 4, 4A and 4B are mounted on a frame 99 which slides on rails or tracks 100 into an outer housing 11E which is adapted to be mounted the window opening or wall of a building by means of a mounting frame 101. In this embodiment, the components of the refrigeration system are the same and are interconnected the same way as previously described, and are assigned the same numerals of reference, however, the detailed description of all the same components, the conduits, and their interconnections will not be repeated again here, to avoid repetition.

As with the previously described embodiments, condensation is collected in a tapered-bottom collecting tray 97 disposed beneath the evaporator and condenser which is connected by conduit 51A to a fourth reservoir 14D through replaceable filter means 53A and 53B, and potable water is dispensed by one dispensing valves 19 mounted on a front panel 102 of the frame 99. Ambient air is drawn through a replaceable air filter in the front panel and across the nested evaporator unit 39 and condenser unit 30 and the outgoing air, represented by arrow 58 is exhausted to the building exterior through duct 27 and across the secondary condenser 35.

A decorative grid 103 may be attached to the exterior of the outer housing 11E to give the unit an attractive appearance, allowing the installation of many units within a building and giving an exterior appearance that may be required by some building codes or association requirements.

Also as previously described, the secondary condenser unit 35, secondary evaporator 44 and secondary compressor 12A provide a secondary refrigeration means to isolate the refrigeration means for cooling the water from that of condensing the atmospheric moisture. It should be understood that, alternatively, the components of the single compressor embodiment of FIGS. 1 and 4C may be housed within the window or wall mounted housing 11E.

Wall Mounted Units

Figure 6A:
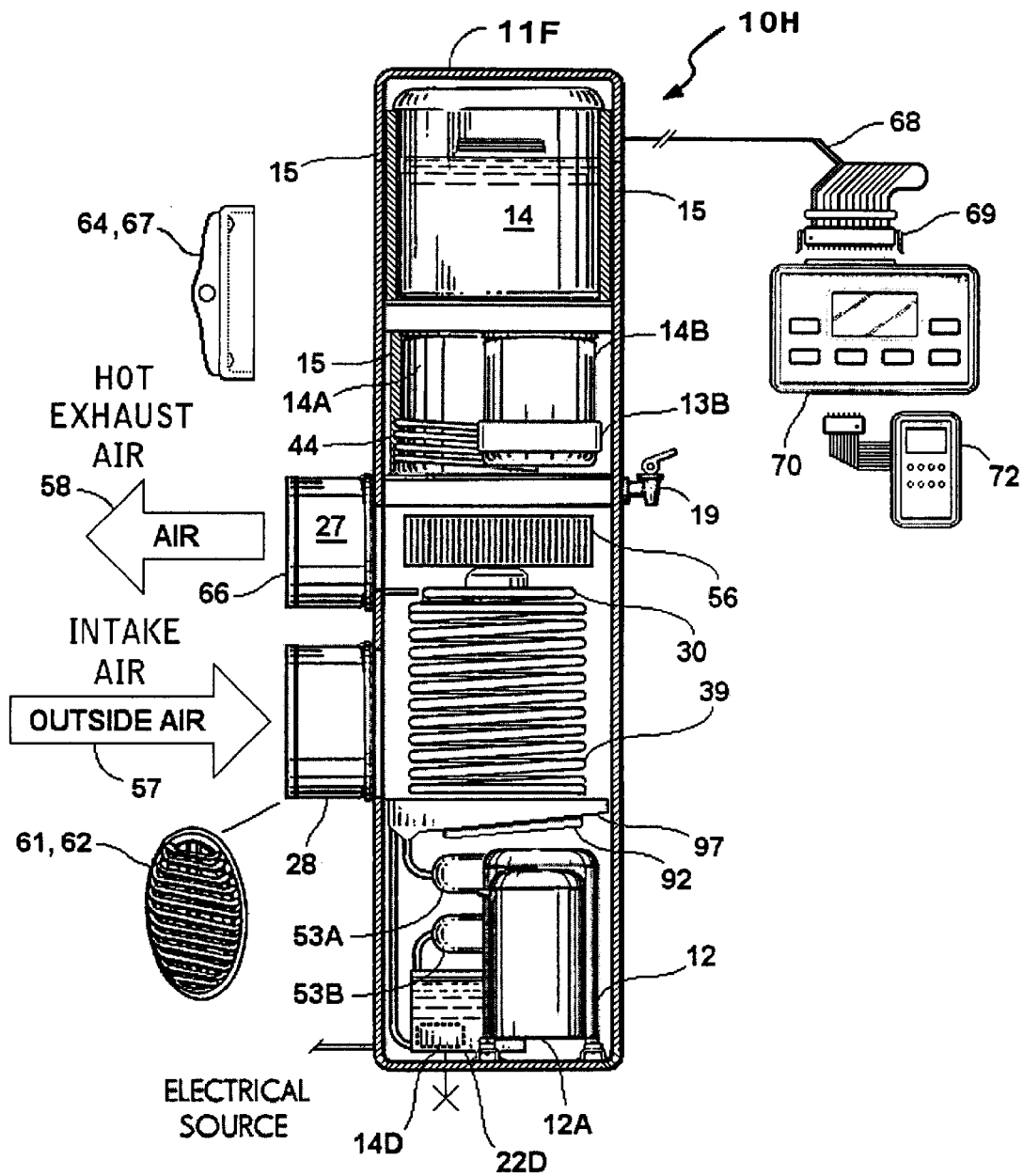
FIG. 6A is a cross sectional view showing diagrammatically an embodiment of the apparatus for extracting potable water from the atmosphere, which may be mounted in an exterior wall or between the studs in an interior wall and ducted to the exterior.

Referring now to FIG. 6A, there is shown an embodiment 10H of the apparatus for extracting potable water from the atmosphere, which is adapted to be mounted in an exterior wall or between the studs in an interior wall of a building and ducted to the building exterior. The components previously shown and described with reference to FIGS. 4, 4A and 4B are mounted within a housing 11F, similar to the freestanding units, but which is sized to be mounted between the studs in a wall of a building, and the ducts 27 and 28 are on the same side of the housing to draw air into the housing from the building exterior and exhaust hot air to the building exterior. The components of the refrigeration system are the same and are interconnected the same way as previously described, and are assigned the same numerals of reference, however, the detailed description of all the same components, the conduits, and their interconnections will not be repeated again here, to avoid repetition.

The outer end of the intake duct 28 is provided with a replaceable air filter 61, which is maintained thereon by a retainer ring 62, or other suitable means. The outer end of the exhaust duct 27 may be provided with exhaust louvers or shutters 66, which may be closed by gravity or other means conventional in the art. The shutters 66 help to keep out undesirable environmental elements when the system is in a non-operating state. Optional removable caps or covers 64, 67 may be used to cover the outer end of the ducts 27 and 28 in hostile conditions or environments. It should be understood that, alternatively, the components of the single compressor embodiment of FIGS. 1 and 4C may be housed within the wall mounted housing 11F.

Figure 6B:
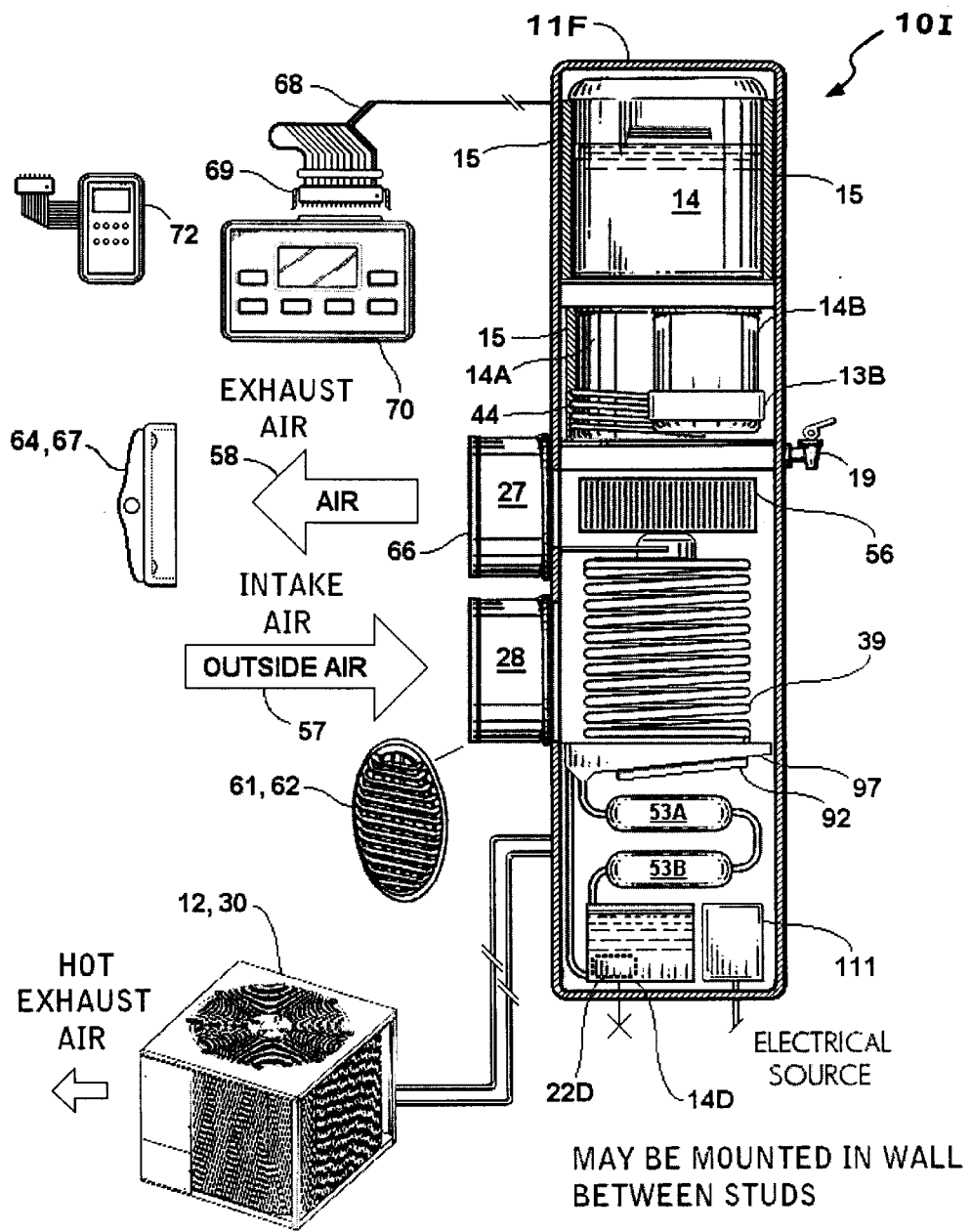
FIG. 6B is a cross sectional view showing diagrammatically a modification of FIG. 6A, wherein the primary compressor and condenser are disposed exterior of the building.

FIG. 6B shows a modification 101 of the of the apparatus for extracting potable water from the atmosphere, similar to FIG. 6A which is adapted to be mounted in an exterior wall or between the studs in an interior wall of a building and ducted to the building exterior. In this modification. the primary compressor 12 and primary condenser unit 30 are disposed exterior of the building and are connected via a conduit with the water production unit inside the building. The primary evaporator 39 is contained within the housing 11F. Referring additionally to FIG. 4C, the remote primary compressor 12 is connected to the intake side of the remote primary condenser 30 through a pressure sensing device 32, and the outlet side of the primary condenser 30 is connected to the inlet side of the evaporator 39 through the receiver 33, through filter or dryer 41, and expansion valve 42. The outlet side of the primary evaporator 39 is connected to the return side of the compressor 12 through a check valve 46, a filter or dryer 41, an optional accumulator 47 and a pressure sensing device 48. The intake side of the secondary condenser 35 (not shown in FIG. 6B) which may be contained within the housing or, alternatively, disposed in or around the warm water reservoir 14B is also connected to the compressor 12 through the pressure sensing device 32 and a solenoid valve 38. The outlet side of the secondary condenser 35 is connected through check valve 36 to the receiver 33.

The outlet side of the primary condenser 30 is also connected by a diverging conduit to the inlet side of the secondary evaporator 44 within or around the cold water reservoir 14A through an expansion valve 43. The outlet side of the secondary evaporator 44 is connected to the return side of the compressor 12 through a check valve 50 and the filter or dryer 41, optional accumulator 47 and pressure sensing device 48.

As previously described, the secondary condenser unit 35, secondary evaporator 44 (FIGS. 6A and 6B) and secondary compressor 12A (FIG. 6A) provide a secondary refrigeration means to isolate the refrigeration means for cooling the water from that of condensing the atmospheric moisture. The embodiment of FIG. 6B may be operated to act simultaneously as an apparatus for extracting potable water from the atmosphere, and as a heat pump for heating and cooling the air in the building. In these embodiments, the condensation is increased substantially because of access to the humid atmosphere of the outside air.

Remote Water Dispenser Unit

Figure 7:
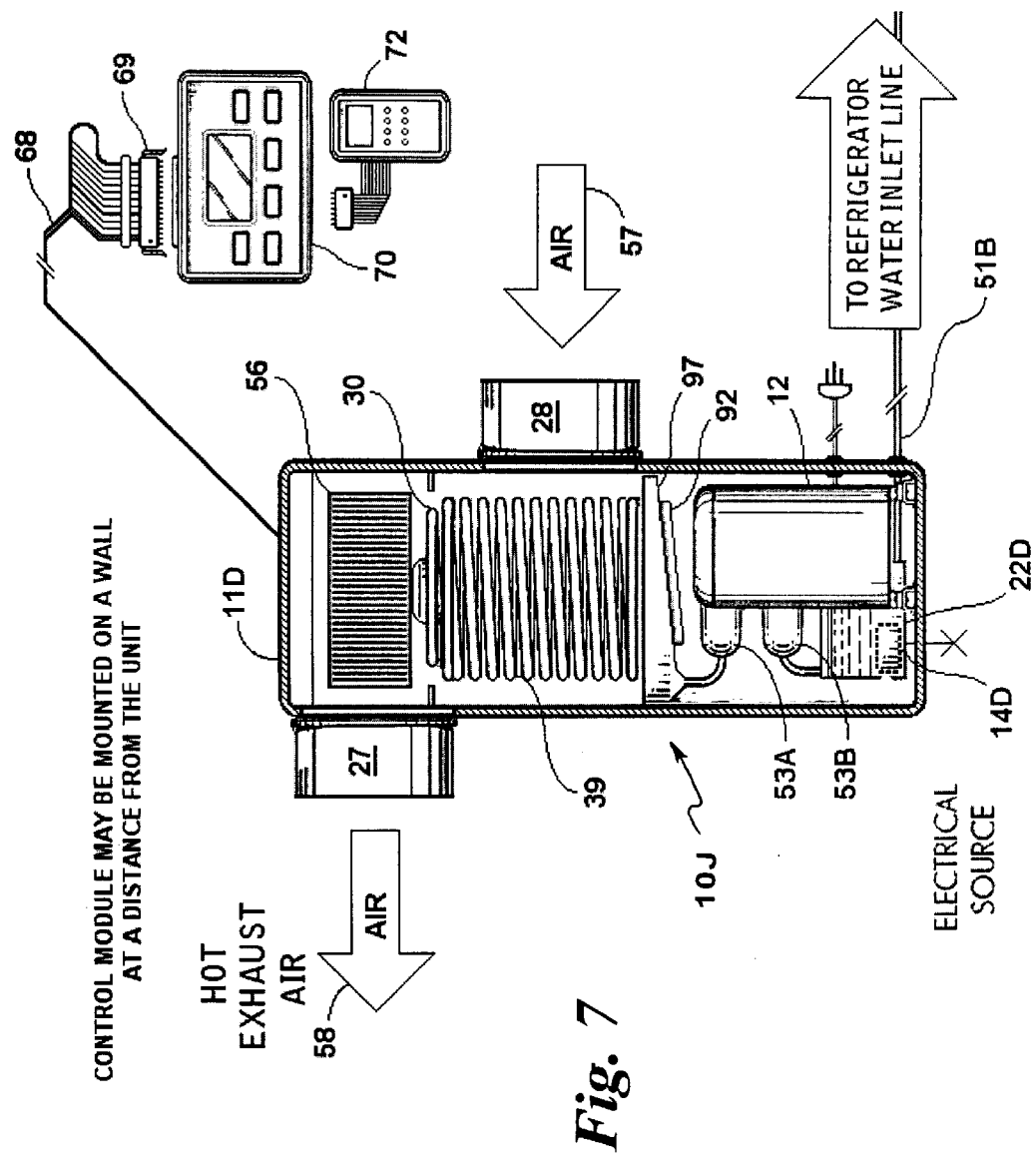
FIG. 7 is a cross sectional view showing diagrammatically an embodiment of the apparatus for extracting potable water from the atmosphere which is mounted in a duct for access to the inside and/or the outside atmosphere, and the dispensing means is connected with a refrigerator water inlet line.

Referring now to FIG. 7, there is shown an embodiment 10J of the apparatus for extracting potable water from the atmosphere, similar to FIG. 6A, which may be connected inline with a duct for access to the inside and/or the outside atmosphere, and the dispensing means is connected with a refrigerator water inlet line. The housing 11G is modified such that the ducts 27 and 28 are adapted to be in communication with a duct system so as to draw air into the housing and exhaust hot air from the housing to the atmosphere. The unit may be installed inline anywhere in the duct system. Control module 70 may be located on a wall or other convenient location. There is a fan, 56, a single compressor 12, a nested primary evaporator 39 and primary condenser 30, and a reservoir 14D within the housing. In this embodiment the secondary condenser unit 35 and secondary evaporator 44 are not used. Instead, when the water is condensed and collected, it is sent to another source, such as the refrigerator water inlet line.

The single compressor system components previously described above with reference to FIG. 4C are given the same numerals of reference, however, the detailed description of all the same components described previously will not be repeated again here, to avoid repetition.

The compressor 12 is connected to the intake side of the condenser 30 through a pressure sensing device 32, and the outlet side of the primary condenser 30 is connected to the inlet side of the evaporator 39 through the receiver 33, through filter or dryer 41, and expansion valve 42. The outlet side of the primary evaporator 39 is connected to the return side of the compressor 12 through a check valve 46, a filter or dryer 41, an optional accumulator 47 and a pressure sensing device 48. The outlet side of the evaporator 39 is connected to the return side of the compressor 12 through a check valve 46, a filter or dryer 41, an optional accumulator 47 and a pressure sensing device 48.

Condensation is collected by the tapered-bottom collecting tray 97 disposed beneath the nested evaporator 39 and condenser 30 which is connected by conduit 51A to reservoir 14D through replaceable filter means 53A and 53B. The collecting tray 97 may be provided with a strip heater 92 or other means for drying any drips, spills, or moisture when the unit is not operating. Water is pumped through conduit 51B by pump 22D to the water inlet line of the refrigerator and collected in a water reservoir in the refrigerator, where it is kept cool by the existing refrigeration system of the refrigerator, and dispensed via the existing water dispenser system of the refrigerator.

Hybrid Air Conditioning Units with Remote Water Dispenser

Figure 8A:
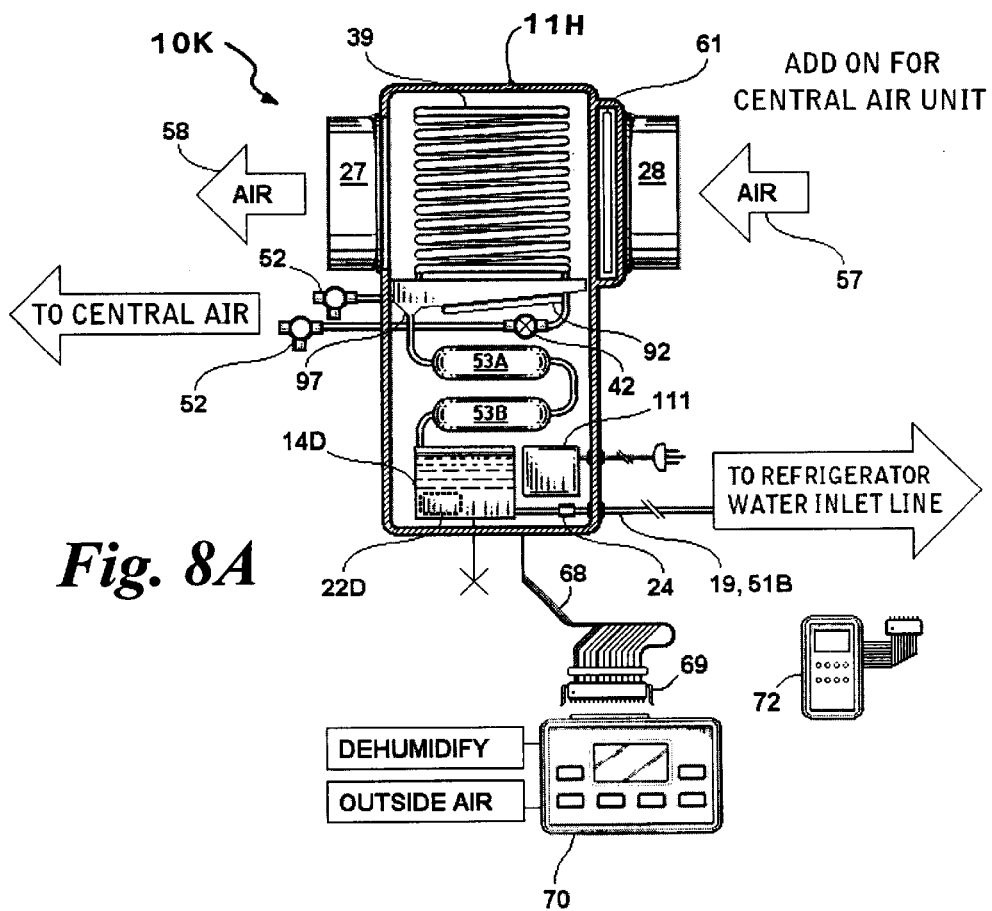
FIGS. 8A and 8B are cross sectional views showing diagrammatically an embodiment of the apparatus for extracting potable water from the atmosphere, similar to the embodiments of FIGS. 6B and 7, wherein the unit is connected with a central air conditioning duct and the compressor, condenser, and dispensing means are remote from the unit.
Figure 8C:
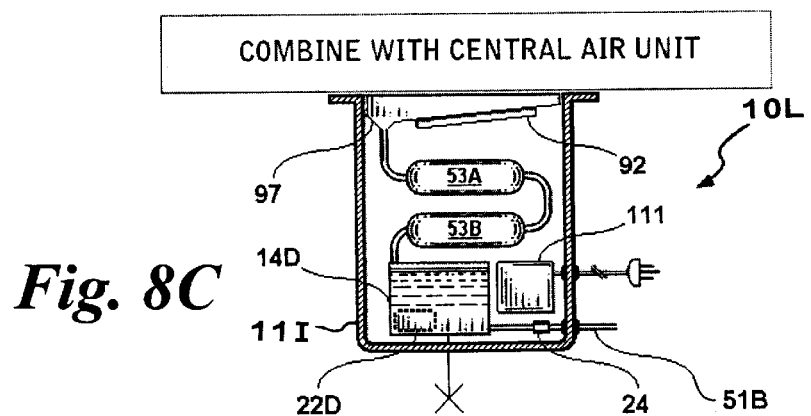
FIG. 8C is a cross sectional view showing diagrammatically a modification of the apparatus for extracting potable water from the atmosphere, similar to FIGS. 8A and 8B, which is connected beneath the evaporator coil of a conventional central air conditioning system and the compressor. condenser, and the dispensing means are remote from the unit.
Figure 8B:
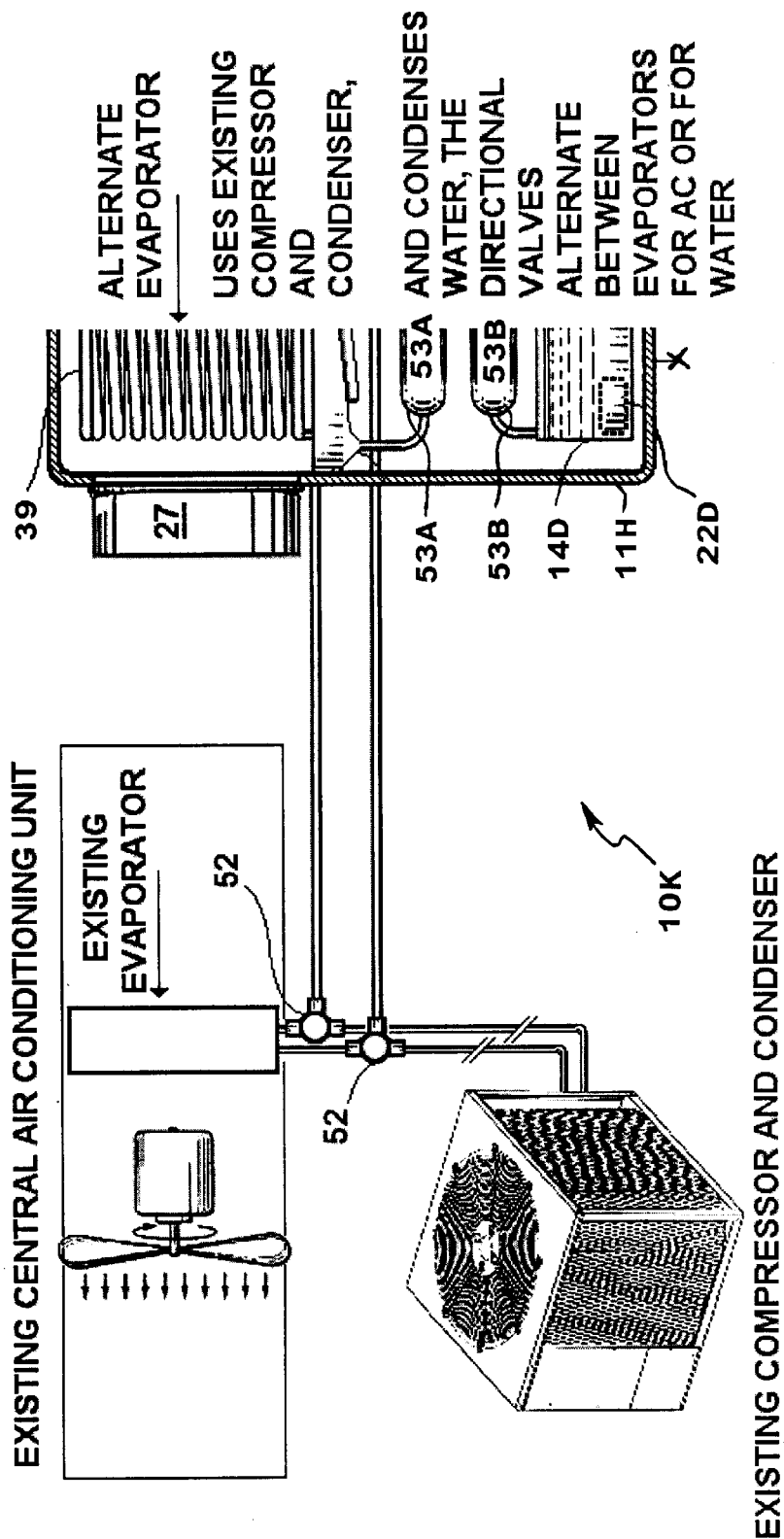

FIGS. 8A and 8B show an embodiment 10K of the apparatus for extracting potable water from the atmosphere, similar to the embodiments of FIGS. 6B and 7, wherein the unit is connected with a central air conditioning duct for access to the inside and/or the outside atmosphere, and the compressor, the condenser, and the dispensing means are remote from the unit. The housing 11H is modified such that the ducts 27 and 28 are adapted to be in communication with the duct system of an existing central air conditioning system. There is an evaporator 39 and a reservoir 14D within the housing. An electrical connection box 111 for miscellaneous electrical controls may also be mounted inside the housing. Control module 70 may be located on a wall or other convenient location.

In this embodiment the fan 56, the secondary condenser unit 35 and secondary evaporator 44 are not used. Instead, the system utilizes the compressor, condenser and fan or blower of the existing air conditioning system, and when the water is condensed and collected in the water production unit, it is sent to another source, such as the refrigerator water inlet line. The single compressor system components previously described above with reference to FIGS. 4C, 6B and 7 are given the same numerals of reference, however, the detailed description of all the same components described previously will not be repeated again here, to avoid repetition.

In this embodiment, the ducts 27 and 28 are in communication with an existing central air conditioning duct and utilizes the existing fan or blower to draw air into the housing 11H through a replaceable air filter and exhaust hot air to the atmosphere. The inlet and outlet of the evaporator 39 in the housing are connected between the existing condenser unit and the inlet and outlet of the evaporator of the existing central air unit by directional valves 52 and expansion valves 42 (only one shown).

Condensation is collected by the tapered-bottom collecting tray 97 disposed beneath the evaporator 39 which is connected by conduit to reservoir 14D through replaceable filter means 53A and 53B. The collecting tray 97 may be provided with a strip heater 92 or other means for drying any drips, spills, or moisture when the unit is not operating. Water is pumped through conduit 51B by pump 22D to the water inlet line of the refrigerator and collected in a water reservoir in the refrigerator, where it is kept cool by the existing refrigeration system of the refrigerator, and dispensed via the existing water dispenser system of the refrigerator.

The control module 70, which may be located on a wall or other convenient location, and may be integrated with a thermostat, controls the operation of the directional valves 52. The directional valves 52 allow the evaporator coil 39 to be used in place of the existing evaporator coil in the central air unit. The directional valves 52 may be switched to place either the evaporator 39 of the water producing unit, or the existing evaporator into the existing refrigeration circuit of the central air system. When the air conditioning system is turned on, the directional valves 52 switch into position to use the existing air conditioning evaporator to cool the house, but if the air conditioning is not wanted at the time and water is, the directional valves may be switched over to the alternate evaporator 39 to condense water for drinking. Thus, water may be condensed without cooling the house.

FIG. 8C shows a modification 10L of the apparatus for extracting potable water from the atmosphere, similar to the embodiments of FIGS. 8A and 8B, which is connected with a central air conditioning unit and the compressor, the condenser, and the dispensing means are remote from the unit. The housing 11I is modified to fit beneath the evaporator coil of the existing central air conditioning system. In this modification the housing contains a collecting tray 97 and a reservoir 14D. An electrical connection box 111 for miscellaneous electrical controls may also be mounted inside the housing. Control module 70 may be located on a wall or other convenient location.

In FIG. 8C, the tapered-bottom collecting tray 97 is disposed beneath the existing evaporator of the existing central air conditioning unit and is connected to the reservoir 14D through replaceable filter means 53A and 53B to collect condensation. The collecting tray 97 may be provided with a strip heater 92 or other means for drying any drips, spills, or moisture when the unit is not operating. Water is pumped through conduit 51B by pump 22D to the water inlet line of the refrigerator and collected in a water reservoir in the refrigerator, where it is kept cool by the existing refrigeration system of the refrigerator, and dispensed via the existing water dispenser system of the refrigerator. This embodiment allows the existing air conditioning system to condense water for drinking.

Mobile Units

Figure 9:
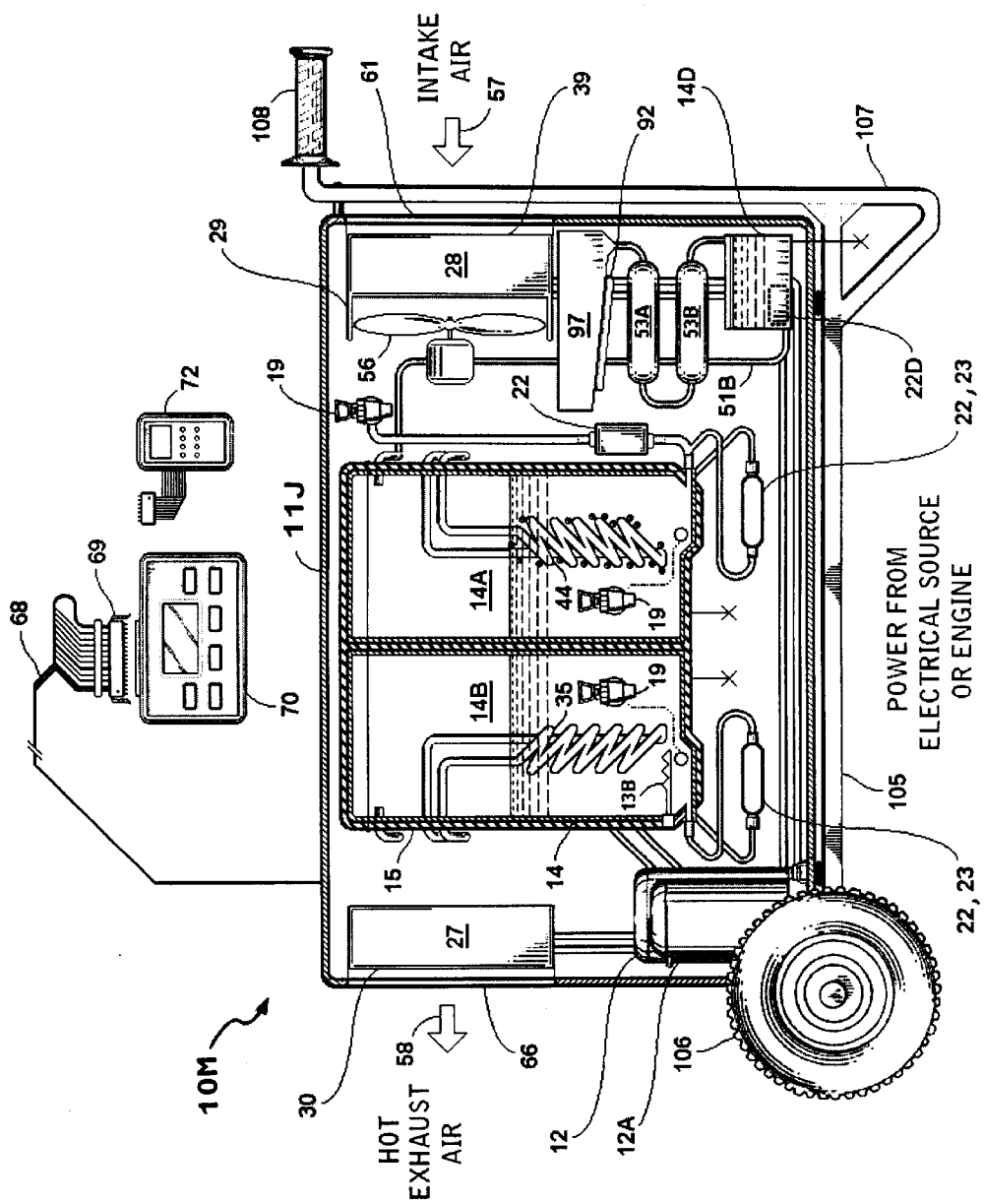
FIG. 9 is a cross sectional view showing diagrammatically a portable indoor/outdoor wheeled apparatus for extracting potable water from the atmosphere in accordance with the present invention.

Referring now to FIG. 9, there is shown diagrammatically a portable or mobile indoor/outdoor embodiment 10M of the apparatus for extracting potable water from the atmosphere, wherein the components are contained in a housing 11J secured to a wheeled cart 105. The cart 105 has a pair of wheels 106 at one end, and a pair of legs 107 and a handle 108 at the opposite end. Many of the system components previously described above are given the same numerals of reference, however, the detailed description of all the same components will not be repeated again here, to avoid repetition.

In this arrangement, the reservoir at the upper end of the housing is divided into a cold water reservoir compartment 14A and a warm or hot water reservoir compartment 14B. which are insulated as indicated at 15. Conduits 21 extend from the bottom of the reservoir compartments 14A, 14B, through a circulating pump 22 and replaceable filter 23, respectively, and return to the respective reservoir compartment. Each of the reservoir compartments 14A and 14B is vented to allow proper flow and water is provided with a dispensing valve 19 for removing the water therefrom. A first compressor 12 and a secondary compressor 12A are disposed on the lower portion of the housing 11J. A secondary evaporator 44 is disposed in or around the cold water reservoir compartment 14A, and a secondary condenser unit 35 is disposed in or around the warm water compartment 14B. Alternatively, the secondary condenser unit 35 may be disposed ih the air stream, in or on the back of the housing.

Duct section 27 is contained within the rear portion of the housing 11A and duct sections 28 and 29 are contained within front portion of the housing for conducting atmospheric air through the housing. Duct section 27 contains the condenser unit 30, and duct section 28 contains the evaporator unit 39. Duct section 29 contains the motorized blower or fan 56, which draws ambient air from the atmosphere through a replaceable air filter 61 and the evaporator unit 39 in duct 28, and the outgoing air is exhausted through the condenser unit 30 in duct 27 and through exhaust louvers or shutters 66 on the back of the housing. A heat strip may also be disposed in the ducts to heat incoming air.

Condensation is collected in collection tray 97, which may be combined with duct section 28 and may be provided with a strip heater 92. Collection tray 97 is connected through replaceable filter means 53A and 53B to a third reservoir 14D. Reservoir 14D is connected to the reservoir compartment 14A by conduit 51B through an optional replaceable filter (not shown) and water is pumped from reservoir 14D to its dispensing valve 19 through conduit 51B by pump 22D which preferably allows the conduit to drain into reservoir 14D when not operating to assure clean and fresh water. Pump 22D may be integrated into reservoir 14D allowing the reservoir to fill to a water level sensor in the reservoir and then pump the condensed water. preventing the pump from cycling erratically.

As with the previously described embodiments, the secondary condenser unit 35, secondary evaporator 44 and secondary compressor 12A provide a secondary refrigeration means to isolate the refrigeration means for cooling the water from that of condensing the atmospheric moisture. It should be understood that, alternatively, the components of the single compressor embodiments described above may be housed within the housing 11J secured to the wheeled cart 105.

FIG. 9A shows a modification 10N of the portable or mobile indoor/outdoor embodiment apparatus for extracting potable water from the atmosphere, wherein the housing 11K is secured to a cart 105 having wheels 106 and provided with fold-out solar cell panels 112. Many of the system components previously described above are given the same numerals of reference, however, some of the components are not shown in this view and the detailed description of all the components will not be repeated again here, to avoid repetition.

In this arrangement, the housing 11K is similar to the housing of FIG. 7 wherein the fan 56 draws air into the housing through duct 28, across the nested evaporator unit 39 and condenser unit 30 and exhausts hot air from the housing through duct 27. In the illustrated example, the components of the single compressor embodiment of FIGS. 1, 4C and 7 are shown in the housing, however, it should be understood that, alternatively, the previously described secondary condenser unit, secondary evaporator and secondary compressor may also be utilized to provide a secondary refrigeration means to isolate the refrigeration means for cooling the water from that of condensing the atmospheric moisture. The tapered-bottom collecting tray 97 disposed beneath the nested evaporator 39 and condenser 30 and is connected to the reservoir 14D through replaceable filter means 53A and 53B to collect condensation.

The compressor 12 is disposed in the lower portion of the housing along with a DC battery 113. The compressor 12 may be powered by the DC battery 113 and/or supplemented by the solar cell panels 112, or alternatively the compressor 12 may be powered by alternating current, fuel cells, or gas powered electrical generators.

Figure 9C:
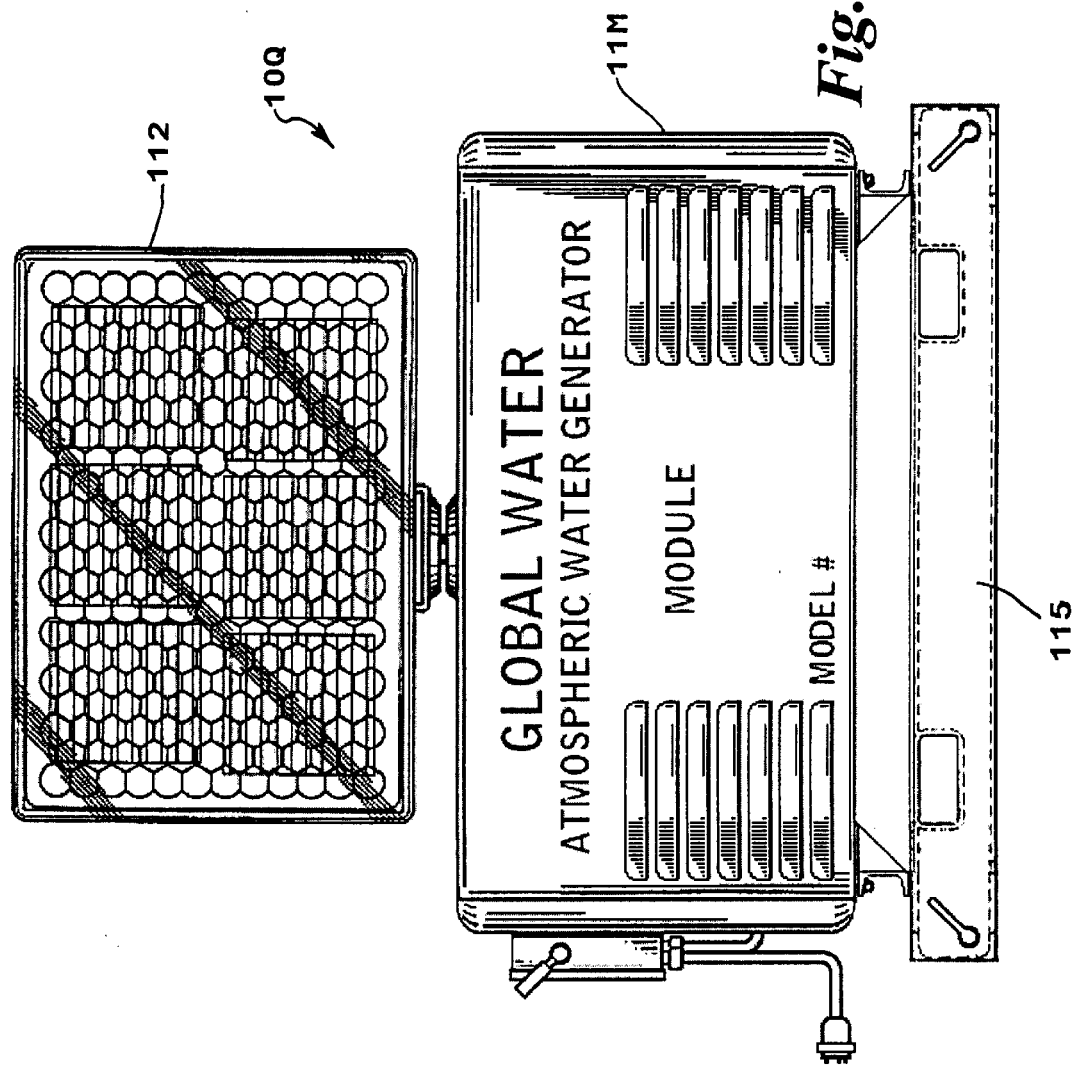
FIG. 9C is a side elevation of a modification of the apparatus for extracting potable water from the atmosphere which is provided with fold-out solar cell panels and mounted on a skid.

FIG. 9B shows another modification 10P of the portable or mobile indoor/outdoor apparatus for extracting potable water from the atmosphere wherein the housing 11L is secured to a trailer chassis 114 and provided with fold-out solar cell panels 112, and FIG. 9C shows still another modification 10Q wherein the housing 11M is secured to a skid 115 and provided with fold-out solar cell panels 112. It should be understood that the components of the single compressor embodiments, or the components of the dual compressor embodiments having the secondary condenser unit and secondary evaporator unit may be contained within the housings 11K, 11L and 11M.

The wheeled, trailer mounted, and skid mounted units may be utilized as modular units and grouped in multiple units at a location to provide potable drinking water on a large scale basis and allow easy replacement without interruption of the water supply.

Vehicle Mounted Unit

Figure 10:
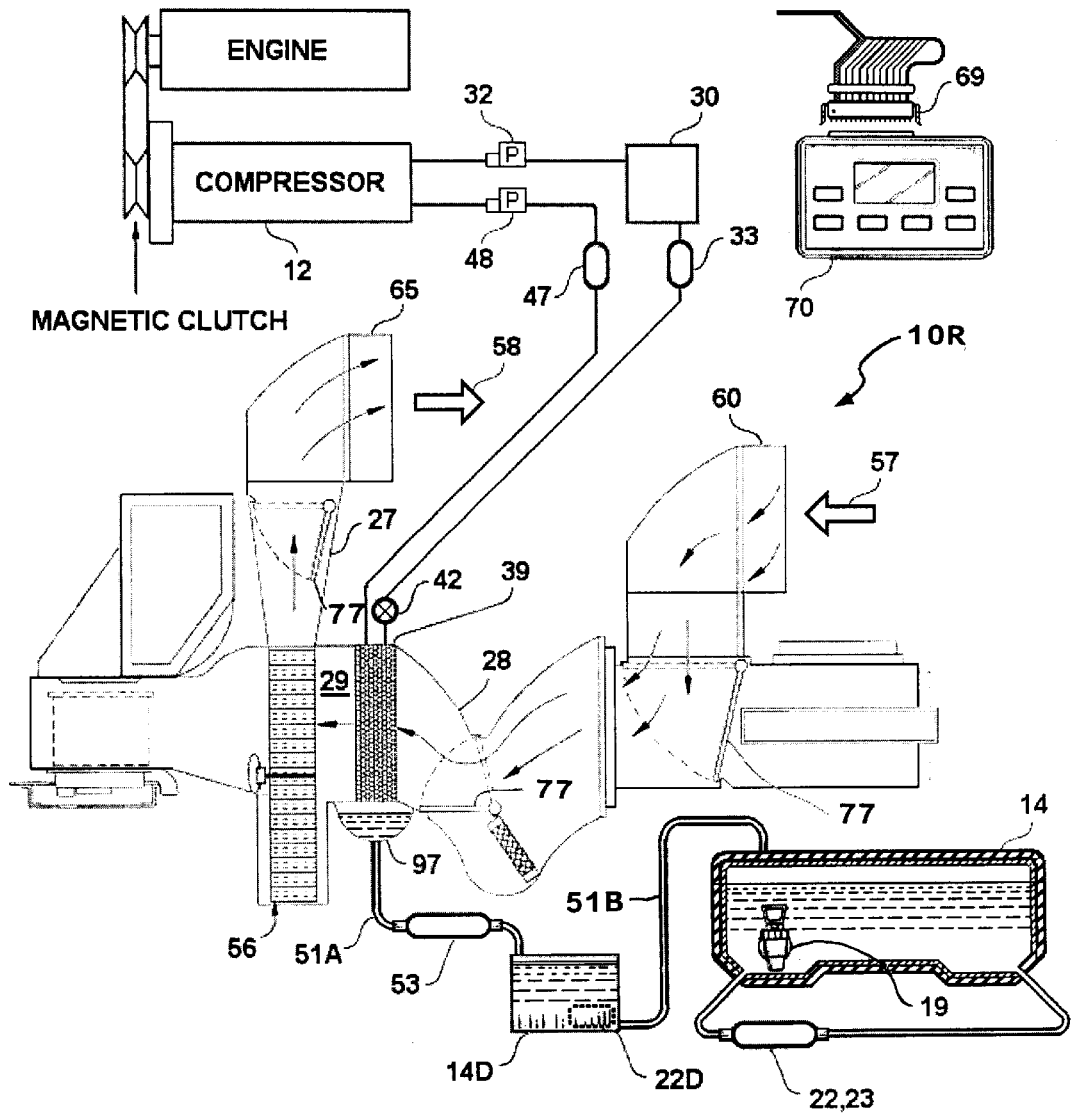
FIG. 10 is a schematic diagram showing an embodiment of the apparatus for extracting potable water from the atmosphere which is mounted in a vehicle and the compressor is powered by the vehicle engine.

FIG. 10 shows an embodiment 10R of the apparatus for extracting potable water from the atmosphere that is disposed in a vehicle. In this embodiment, the compressor 12 is powered by the vehicle engine through a belt drive and magnetic clutch. The condenser unit 30 is connected at its intake side to the compressor 12 through a pressure sensing device 32. The outlet side of the condenser unit 30 is connected to a receiver 33. Duct section 28 contains the evaporator unit 39. The receiver 33 is connected to the intake of the evaporator unit 39 through an expansion valve 42. The outlet side of the evaporator unit 39 is connected to the return side of the compressor 12 through an accumulator 47 and a pressure sensing device 48. Air 57 is drawn by a fan 56 in duct 29 into the duct section 28 via an air intake portion 60 and restrictor dampers 77, across the evaporator unit 39, and hot air 58 is exhausted through a third restrictor damper 77 and the exhaust portion 65 of duct 27.

Condensation is collected in collection tray 97, which may be combined with duct section 28 and may be provided with a strip heater (not shown). Collection tray 97 is connected via conduit 51A and replaceable filter means 53 to reservoir 14D. Reservoir 14D is connected to reservoir compartment 14, which is provided with a dispensing valve 19 and may be fitted with a drain, and water is pumped from reservoir 14D to reservoir 14 through conduit 51B by pump 22D. Pump 22D may be integrated into reservoir 14D allowing the reservoir to fill to a water level sensor in the reservoir and then pump the condensed water, preventing the pump from cycling erratically. The collected water in reservoir 14 may be circulated through filters 23 by circulating pump 22 and returned to the reservoir to remove any remaining undesirable particles, odors, or elements from the collected water. The collected water may be removed through the dispensing valve 19. Alternatively, removable reservoirs may be used, wherein the water may be poured directly from the reservoir. Operation of the system is preferably controlled by a control module 70 which may contain switches and buttons necessary for operation of the system, and LED or LCD indicators and displays.

OPERATION

Referring to the embodiments of FIGS. 1 and 4C, in operation the present water collector system draws atmospheric air 57 through the air filter 61 and the duct section 28, pulling the air stream through the evaporator unit 39 where the filtered air is reduced in temperature, and exhausts the filtered and cooled air 58 through the condenser 30 in duct section 27.

A compressed refrigerant vapor is cycled through the system by the compressor 12. As the vapor is compressed to near a state of adiabatic compression, its temperature rises due to the work (energy) added to the vapor by the compressor. The heated and pressurized vapor is then contained and distributed through the system by conduit 31. The temperature may be monitored by sensors 73 on the conduit 31. The heated and pressurized vapor enters the condenser unit 30. The condenser unit 30 is positioned within the duct 27 to cause maximum heat rejection, reducing the temperature of the compressed vapor and condensing it into a high pressure liquid which is collected in the receiver 33. This high pressure liquid is then distributed from the receiver 33 through the dryer 41 through conduit 40 and held within the condenser 30 by the expansion valve 42.

While the high-pressure refrigeration liquid is being held back under pressure by expansion valve 42, the evaporator side of the valve is placed under a suction or vacuum. When the temperature of the evaporator is too high, expansion valve 42 meters the high pressure refrigeration liquid into evaporator unit 39, which is in a state of vacuum or low pressure, and causes the contained high-pressure refrigeration liquid, to boil or evaporate when suddenly introduced into the vacuum, thereby absorbing heat from the incoming atmospheric air stream 57, and transforming it into a low-pressure refrigeration liquid, and continuing the transformation into a low-pressure refrigeration vapor such that atmospheric moisture is collected in the form of potable water on evaporator unit 39. The temperature may be monitored by means of temperature sensor 73.

The low-pressure refrigeration vapor then leaves evaporator unit 39 through conduit 45 and check valve 46. The evaporator unit 39 is positioned to cause maximum recovery of atmospheric water from the air stream 57. Evaporator 39 absorbs heat from the heat strip and incoming atmospheric air stream 57 lowering the air temperature below it's dew point and causing the atmospheric moisture to then collect on the surface of the evaporator element in the form of water droplets, due to condensation. The condensation on the evaporator unit 39 is then collected in the tapered lower portion of duct section 28 or collection tray 97 and distributed through replaceable filter 53 trapping particles of undesirable elements, then continues on through water seal 54, which helps to isolate the incoming environmental elements and the ambient air temperature from the reservoir 14. The level of collected water in the lower portion of duct 28 is monitored by a sensing device 74 which may be of a float or electronic type.

The water in the water seal 54 is continuously replaced by newly condensed water during normal operation. The water is then distributed through directional valve 52 which directs collected water to the appropriate reservoir compartment 14A or 14B, and when divergence is not required, collected water may be distributed directly into the reservoir. Water level sensing device 17 monitors the level of the collected water which may also be monitored by temperature sensors 73. Reservoir 14 may have a hose connection 108 to the outside of the housing 11 for ease of cleaning.

Water collected in the cold water compartment 14A of the reservoir 14 is maintained at a preferred cool temperature by the secondary evaporator unit 44, which when operating, may operate intermittently or simultaneously with evaporator unit 44, and may be operated continuously after the reservoir compartment has been filled. The secondary evaporator unit 44 is positioned to cause maximum heat transfer and absorption when submersed into the collected water to bring it to, and maintain, a desired temperature of the water. The rate at which heat is transferred is greatly enhanced by the direct submersion of the secondary evaporator unit. The temperature may be monitored by means of sensor 18. The high-pressure refrigerant in a liquid state contained in conduit 49 is held back under pressure by expansion valve 43 while the opposite side of the valve is place under a suction or vacuum.

When the temperature of the collected water is higher than desired, expansion valve 43 meters the high pressure refrigerant in a liquid state into the secondary evaporator unit 44, which is in a state of vacuum, and causes the high-pressure refrigeration liquid to boil or evaporate when suddenly introduced into the vacuum. Thus, heat is absorbed from the collected water and transforms the contained high-pressure refrigerant in a liquid state into a low-pressure refrigerant vapor. The low-pressure vapor is contained by check valve 50 in conduit 45, dryer 41 and accumulator 47 which traps any remaining liquid allowing further transformation into a vapor and then passes it on through conduit 45 where it is returned to compressor 12. Pressure may be monitored by pressure sensing device 48.

The collected water in warm water compartment 14B of reservoir 14 is maintained at a preferred warm temperature by means of secondary condenser unit 35, which may operate continuously and in unity with condenser unit 30, when the warming selection is being utilized, to maximize heat rejection, or simultaneously with condenser 30, maintain a balanced system. The temperature may be monitored by means of temperature sensors 18. The maximum temperature obtainable as heated water is dependent upon the type of refrigerant being used, and upon design requirements. The secondary condenser unit 35 is positioned to cause maximum heat transfer when submersed and reject heat previously absorbed into the collected water, thereby increasing the temperature of the collected water. The rate at which heat is transferred is greatly enhanced by the direct submersion of the secondary condenser unit.

The high-pressure refrigerant vapor in divergence conduit 37 is held back by means of solenoid valve 38. When the temperature of the collected water in compartment 14B is lower than preferred, valve 38 opens causing the high-pressure refrigerant vapor to flow, or to be metered through secondary condenser unit 35, where the heat is rejected into the collected water thereby transforming the contained high-pressure refrigerant vapor into a high-pressure refrigerant liquid which is then sent to receiver 33 through conduit 34 and check valve 36.

The water holding reservoir 14 thus contains heated and cooled water the respective compartments. The collected cold or warm water may then be removed through the dispensing valve 19, or if removable reservoirs are used, poured directly from reservoir. The collected watcer upon accumulating in the reservoir compartments will activate the water level sensing device 17, which may be monitored by control module 70, and the water level may be observed by sight glass 20 or other suitable indicator.

The collected water may be circulated through filters 23 by the circulating pumps 22. The collected water is drawn into conduit 21, pumped through replaceable filters 23, and then returned to the reservoir. The filters 23 assist in removing any remaining undesirable particles, odors. or elements from the collected water.

Pressure sensing devices 24 located within the conduits 21 will increase the circulating pressure upon a resistance in the water filters 23 and turn off the circulating pumps 22 to prevent overload or damage. The filtering time may be selectively set from the control module 70 or it may be fixed for specific applications, including an automatic mode.

When the unit is not operational, positive drainage is assured, for sanitary reasons, by opening valve 54A, which will empty the contents of the environmental seal 54 into the reservoir compartments for further drainage through valves 26 and conduit 25, to dispose of all contents. Valve 54A may also drain the contents to a source outside of unit bypassing the reservoir compartments and a valve located in reservoir 14D for positive drainage.

The convenience group, in addition to the control module, may contain indicators and devices for monitoring the operation of the apparatus and maximizing it's effectiveness and abilities. The water drip tray located on the front is one such convenience. The present apparatus also preferably contains noise dampening materials and housing seals to keep out undesirable elements and provide a clean interior for sanitary and operational reasons. The nested coiled condenser and evaporator maximizes condensation. A much larger system may be put into the same housing, including mounting the compressor inside the actual condenser coil if desired allowing additional room for other options and filters.

While this invention has been described fully and completely with special emphasis upon preferred embodiments, it should be understood that within the scope of the appended claims the invention may be practiced otherwise than as specifically described herein.

What is claimed is:

1. Apparatus for use in a building for producing potable water from moisture-laden air, comprising:

a housing adapted for placement in a building and having air intake means and air exhaust means for conducting air therethrough;

air filtration means for filtering air entering said housing;

refrigeration means including a refrigerant evaporator and condenser disposed in said housing, a compressor operatively connected with a power source and with said condenser, and an expansion valve operatively connected between said condenser and said evaporator;

said evaporator and said condenser each helically coiled, and said coiled condenser disposed generally concentrically within said coiled evaporator in a nested relation;

forced-draft means operatively connected with said power source for drawing ambient air in the building into said housing through said intake means, conducting the air in heat exchanging relationship with said evaporator and said condenser, and exhausting the air from said housing;

the refrigerant in a refrigerating cycle being compressed in said compressor and fed through said condenser where it is liquefied to dissipate heat into air passing through said housing then fed through said expansion valve and expanded then fed through said evaporator to abstract heat from air passing through said housing, the air being filtered by said air filtration means and cooled by said evaporator to form condensation thereon and the cooled air being exhausted through said condenser;

reservoir means connected with said evaporator for collecting the condensation formed thereon;

isolating means disposed between said evaporator and said reservoir means for isolating the condensation collected in said reservoir from impurities and from surrounding ambient air temperature;

temperature control means for controlling the temperature of the condensation passing between said evaporator and said reservoir means to facilitate consistent temperature of the condensation collected in said reservoir means;

water filtration means disposed between said evaporator and said reservoir means for removing impurities from the condensation such that the collected condensation is potable and suited for human consumption;

water dispensing means connected with said reservoir means for removing the collected condensation; and monitoring and control means for monitoring and controlling the operation of said apparatus; wherein said apparatus provides potable water, and serves as an air purifier and dehumidifier.

2. The apparatus according to claim 1, wherein said housing, said air intake means, and said air exhaust means are disposed substantially inside of the building; and said forced-draft means draws air in the building into said housing through said intake means, conducts the air in heat exchanging relationship with said evaporator and said condenser, and exhausts the air from said housing back into the building.

3. Apparatus for use in a building for producing potable water from moisture-laden air, comprising:

a housing adapted for placement in a building and having air intake means and air exhaust means for conducting air therethrough;

air filtration means for filtering air entering said housing;

first refrigeration means including a first refrigerant evaporator and first condenser disposed in said housing, a first compressor operatively connected with a power source and with said first condenser, and an expansion valve operatively connected between said first condenser and said first refrigerant evaporator;

forced-draft means operatively connected with said power source for drawing ambient air in the building into said housing through said intake means, conducting the air in heat exchanging relationship with said first evaporator and said first condenser, and exhausting the air from said housing;

the refrigerant of said first refrigeration means in a refrigerating cycle being compressed in said first compressor and fed through said first condenser where it is liquefied to dissipate heat into air passing through said housing then fed through said expansion valve and expanded then fed through said first evaporator to abstract heat from air passing through said housing, the air being filtered by said air filtration means and cooled by said first evaporator to form condensation thereon and the cooled air being exhausted through said first condenser;

a first and a second reservoir connected with said first evaporator for collecting the condensation formed thereon;

isolating means disposed between said first evaporator and said first reservoir for isolating the condensation collected therein from impurities and from surrounding ambient air temperature;

second refrigeration means including, a second refrigerant compressor operatively connected with said power source, a second condenser operatively connected with said second compressor, a second evaporator operatively connected with said second condenser and with said second compressor, and an expansion valve operatively connected between said second condenser and said second evaporator;

said second evaporator disposed in heat exchanging relationship with the collected condensation in said first reservoir, and said second condenser disposed in the path of air exhausted from said housing;

the refrigerant of said second refrigeration means in a refrigerating cycle being compressed in said second compressor, fed through said second condenser where it is liquefied to dissipate heat into air passing through said housing, fed through said expansion valve and expanded, and fed through said second evaporator to abstract heat from the collected condensation in said first reservoir to provide cool potable condensation;

water filtration means disposed between said first evaporator and said first and second reservoir for removing impurities from the condensation such that the collected condensation is potable and suited for human consumption;

temperature control means for controlling the temperature of the condensation passing between said first evaporator and said first and second reservoir to facilitate consistent temperature of the condensation collected therein;

water dispensing means connected with said first and second reservoir for removing the collected condensation; and monitoring and control means for monitoring and controlling the operation of said apparatus; wherein said first refrigeration means is used for condensing the moisture in the air, said second refrigeration means is used for cooling collected condensation, and said apparatus provides potable water, and serves as an air purifier and dehumidifier.

4. Apparatus for use in a building for producing potable water from moisture-laden air, comprising:

a housing adapted for placement in a building and having air intake means and air exhaust means for conducting air therethrough;

air filtration means for filtering air entering said housing;

first refrigeration means including a first refrigerant evaporator and first condenser disposed in said housing, a first compressor operatively connected with a power source and with said first condenser, and an expansion valve operatively connected between said first condenser and said first refrigerant evaporator;

forced-draft means operatively connected with said power source for drawing ambient air in the building into said housing through said intake means, conducting the air in heat exchanging relationship with said first evaporator and said first condenser, and exhausting the air from said housing;

the refrigerant of said first refrigeration means in a refrigerating cycle being compressed in said first compressor and fed through said first condenser where it is liquefied to dissipate heat into air passing through said housing then fed through said expansion valve and expanded then fed through said first evaporator to abstract heat from air passing through said housing, the air being filtered by said air filtration means and cooled by said first evaporator to form condensation thereon and the cooled air being exhausted through said first condenser;

a first and a second reservoir connected with said first evaporator for collecting the condensation formed thereon;

isolating means disposed between said first evaporator and said first reservoir for isolating the condensation collected therein from impurities and from surrounding ambient air temperature;

second refrigeration means including, a second refrigerant compressor operatively connected with said power source, a second condenser operatively connected with said second compressor, a second evaporator operatively connected with said second condenser and with said second compressor, and an expansion valve operatively connected between said second condenser and said second evaporator;

said second evaporator disposed in heat exchanging relationship with the collected condensation in said first reservoir, and said second condenser is disposed in heat exchanging relationship with the collected condensation in said second reservoir;

the refrigerant of said second refrigeration means in a refrigerating cycle being compressed in said second compressor, fed through said second condenser where it is liquefied to dissipate heat into the collected condensation in said second reservoir to provide heated potable condensation, fed through said expansion valve and expanded, and fed through said second evaporator to abstract heat from the collected condensation in said first reservoir to provide cool potable condensation;

water filtration means disposed between said first evaporator and said first and second reservoir for removing impurities from the condensation such that the collected condensation is potable and suited for human consumption;

temperature control means for controlling the temperature of the condensation passing between said first evaporator and said first and second reservoir to facilitate consistent temperature of the condensation collected therein;

water dispensing means connected with said first and second reservoir for removing the collected condensation; and monitoring and control means for monitoring and controlling the operation of said apparatus; wherein
said first refrigeration means is used for condensing the moisture in the air, said second refrigeration means is used for heating and cooling collected condensation, and said apparatus provides potable water, and serves as an air purifier and dehumidifier.

5. Apparatus for use in a building for producing potable water from moisture-laden air, comprising:

a housing adapted for placement in a building and having air intake means and air exhaust means for conducting air therethrough;

air filtration means for filtering air entering said housing;

refrigeration means including a refrigerant evaporator and condenser disposed in said housing, a compressor operatively connected with a power source and with said condenser, and an expansion valve operatively connected between said condenser and said evaporator;

forced-draft means operatively connected with said power source for drawing ambient air in the building into said housing through said intake means, conducting the air in heat exchanging relationship with said evaporator and said condenser, and exhausting the air from said housing;

the refrigerant in a refrigerating cycle being compressed in said compressor and fed through said condenser where it is liquefied to dissipate heat into air passing through said housing then fed through said expansion valve and expanded then fed through said evaporator to abstract heat from air passing through said housing, the air being filtered by said air filtration means and cooled by said evaporator to form condensation thereon and the cooled air being exhausted through said condenser;

reservoir means connected with said evaporator for collecting the condensation formed thereon;

isolating means disposed between said evaporator and said reservoir means for isolating the condensation collected in said reservoir from impurities and from surrounding ambient air temperature;

electrical heater means disposed in heat exchanging relationship with the collected condensation in said reservoir means and operatively connected with said power source through said temperature control means to provide heated potable condensation;

water filtration means disposed between said evaporator and said reservoir means for removing impurities from the condensation such that the collected condensation is potable and suited for human consumption;

water dispensing means connected with said reservoir means for removing the collected condensation; and monitoring and control means for monitoring and controlling the operation of said apparatus; wherein
said apparatus provides heated potable water, and serves as an air purifier and dehumidifier.

6. Apparatus for use in a building for producing potable water from moisture-laden air, comprising:
- a housing adapted to be mounted in a window opening in an exterior wall of a building and having air intake means and air exhaust means disposed substantially outside of the building, and having water dispensing means disposed inside of the building;
- air filtration means for filtering air entering said housing;
- refrigeration means including a refrigerant evaporator and condenser disposed in said housing, a compressor operatively connected with a power source and with said condenser, and an expansion valve operatively connected between said condenser and said evaporator;
- forced-draft means operatively connected with said power source for drawing outside air from the exterior of the building into said housing through said intake means, conducting the air in heat exchanging relationship with said evaporator and said condenser, exhausting warm air from said housing back to the exterior of the building, and conducting cool air into the interior of the building;
- the refrigerant in a refrigerating cycle being compressed in said compressor and fed through said condenser where it is liquefied to dissipate heat into air passing through said housing then fed through said expansion valve and expanded then fed through said evaporator to abstract heat from air passing through said housing, the air being filtered by said air filtration means and cooled by said evaporator to form condensation thereon and the cooled air being exhausted through said condenser;
- reservoir means connected with said evaporator for collecting the condensation formed thereon;
- isolating means disposed between said evaporator and said reservoir means for isolating the condensation collected in said reservoir from impurities and from surrounding ambient air temperature;
- water filtration means disposed between said evaporator and said reservoir means for removing impurities from the condensation such that the collected condensation is potable and suited for human consumption;
- said water dispensing means connected with said reservoir means for removing the collected condensation; and
- monitoring and control means for monitoring and controlling the operation of said apparatus; wherein
  - said apparatus functions as a combination air conditioning unit and apparatus for extracting potable water.

7. Apparatus for use in a building for producing potable water from moisture-laden air, comprising:
- a housing disposed in or on a wall of a building, and having air intake means and air exhaust means for conducting air therethrough in air flow communication with the exterior of the building;
- air filtration means for filtering air entering said housing;
- refrigeration means including a refrigerant evaporator and condenser disposed in said housing, a compressor operatively connected with a power source and with said condenser, and an expansion valve operatively connected between said condenser and said evaporator;
- said evaporator disposed within said housing, said compressor and said condenser disposed in a second housing exterior of the building, and said evaporator disposed within said housing;
- forced-draft means operatively connected with said power source comprising a first fan disposed in said housing for drawing outside air from the exterior of the building into said housing through said intake means, conducting the air in heat exchanging relationship with said evaporator, and exhausting the air from said housing back to the exterior of the building, and a second fan disposed in said second housing for conducting ambient outside air in heat exchanging relationship with said condenser, and exhausting hot air from said second housing;
- the refrigerant in a refrigerating cycle being compressed in said compressor and fed through said condenser where it is liquefied to dissipate heat into air passing through said housing then fed through said expansion valve and expanded then fed through said evaporator to abstract heat from air passing through said housing, the air being filtered by said air filtration means and cooled by said evaporator to form condensation thereon and the cooled air being exhausted through said condenser;
- reservoir means connected with said evaporator for collecting the condensation formed thereon;
- isolating means disposed between said evaporator and said reservoir means for isolating the condensation collected in said reservoir from impurities and from surrounding ambient air temperature;
- temperature control means for controlling the temperature of the condensation passing between said evaporator and said reservoir means to facilitate consistent temperature of the condensation collected in said reservoir means;
- water filtration means disposed between said evaporator and said reservoir means for removing impurities from the condensation such that the collected condensation is potable and suited for human consumption;
- water dispensing means connected with said reservoir means for removing the collected condensation; and
- monitoring and control means for monitoring and controlling the operation of said apparatus; wherein
  - said apparatus provides potable water, and serves as an air purifier and dehumidifier.

8. Apparatus for use in a building for producing potable water from moisture-laden air, comprising:
- a housing adapted for placement in a building and having air intake means and air exhaust means for conducting air therethrough;
- air filtration means for filtering air entering said housing;
- refrigeration means including a refrigerant evaporator and condenser disposed in said housing, a compressor operatively connected with a power source and with said condenser, and an expansion valve operatively connected between said condenser and said evaporator;
- forced-draft means operatively connected with said power source for drawing ambient air in the building into said housing through said intake means, conducting the air in heat exchanging relationship with said evaporator and said condenser; and exhausting the air from said housing;
- the refrigerant in a refrigerating cycle being compressed in said compressor and fed through said condenser where it is liquefied to dissipate heat into air passing through said housing then fed through said expansion valve and expanded then fed through said evaporator to abstract heat from air passing through said housing, the air being filtered by said air filtration means and cooled by said evaporator to form condensation thereon and the cooled air being exhausted through said condenser;

reservoir means connected with said evaporator for collecting the condensation formed thereon;

said reservoir means connected with a water inlet line and cool water reservoir of a conventional refrigerator, whereby collected condensation in said reservoir means is conducted through the water inlet line to the cool water reservoir of the conventional refrigerator, maintained in a cool condition by the refrigeration system of the conventional refrigerator, and dispensed as potable water by a cool water dispenser of the conventional refrigerator;

isolating means disposed between said evaporator and said reservoir means for isolating the condensation collected in said reservoir from impurities and from surrounding ambient air temperature;

water filtration means disposed between said evaporator and said reservoir means for removing impurities from the condensation such that the collected condensation is potable and suited for human consumption;

monitoring and control means for monitoring and controlling the operation of said apparatus; wherein said apparatus provides potable water, and serves as an air purifier and dehumidifier.

9. The combination of a central air conditioning system of a building and apparatus for use in the building for producing potable water from moisture-laden air, comprising:

a central air conditioning system with refrigeration means including a refrigerant evaporator disposed in a duct of the central air conditioning system, a condenser, a compressor operatively connected with a power source and with said condenser, and an expansion valve operatively connected between said condenser and said evaporator, said compressor and said condenser disposed in a housing exterior of the building;

a water dispenser housing adapted for placement in the building and having air intake means and air exhaust means for conducting air therethrough in air flow communication with a duct of the central air conditioning system;

air filtration means for filtering air entering said water dispenser housing;

a second evaporator disposed within said water dispenser housing and having an inlet side and outlet side connected between the condenser unit and the inlet and outlet of an evaporator of the conventional central air unit, respectively, through directional valves and expansion valves;

reservoir means connected with said second evaporator for collecting condensation formed thereon;

isolating means disposed between said second evaporator and said reservoir means for isolating the condensation collected in said reservoir from impurities and from surrounding ambient air temperature;

water filtration means disposed between said second evaporator and said reservoir means for removing impurities from the condensation such that the collected condensation is potable and suited for human consumption;

water dispensing means connected with said reservoir means for removing the collected condensation;

a first fan in air flow communication with the evaporator of the conventional central air system that conducts return air through the air conditioning duct from the interior of the building, conducts the air in heat exchanging relationship with said second evaporator in said water dispenser housing and in heat exchanging relationship with the evaporator of the conventional central air conditioning system and conducts cool air back into the interior of the building, and a second fan that conducts ambient outside air in heat exchanging relationship with the condenser the conventional central air system; and monitoring and control means for monitoring and controlling the operation of said apparatus; wherein said directional valves may be switched to selectively place either of said second evaporator in said water dispenser housing or the evaporator of the central air conditioning system into the existing refrigeration circuit of the central air system such that when the central air condition system is turned on, the directional valves allow the use of the evaporator of the central air conditioning system to cool the building, and if air conditioning is not desired, and water is, the directional valves may be switched over to said second evaporator in said water dispenser housing to condense water for drinking without cooling the interior of the building.

10. The combination according to claim 9, further comprising:

a refrigerator having a water inlet line, a refrigeration system, a cool water reservoir, and a cool water dispenser;

said reservoir means connected with said water inlet line and cool water reservoir, collected condensation in said reservoir means is conducted through the said water inlet line to said cool water reservoir, maintained in a cool condition by the refrigeration system of the said refrigerator, and dispensed as potable water by said cool water dispenser.

11. The combination of a central air conditioning system, apparatus for producing potable water from moisture-laden air and a refrigerator having a dispenser for dispensing the potable water, comprising:

a central air conditioning system including a refrigerant compressor and a condenser disposed in a housing exterior of a building, and an evaporator disposed in air flow communication in a duct of the central air conditioning system of the building, said compressor operatively connected with said condenser, and an expansion valve operatively connected between said condenser and said evaporator, a first fan in air flow communication with said evaporator that conducts return air through the air conditioning duct from the interior of the building in heat exchanging relationship with said evaporator and conducts cool air back into the interior of the building, and a second fan that conducts ambient outside air in heat exchanging relationship with said condenser;

the refrigerant in a refrigerating cycle being compressed in said compressor and fed through said condenser where it is liquefied to dissipate heat into the atmosphere, fed through said expansion valve and expanded, then fed through said evaporator to abstract heat from air passing through said duct, the air being cooled by said evaporator to form condensation thereon and cooled air being conducted back into the interior of the building;

reservoir means connected with said evaporator for collecting the condensation formed thereon;

isolating means disposed between said evaporator and said reservoir means for isolating the condensation collected in said reservoir from impurities and from surrounding ambient air temperature;

water filtration means disposed between said evaporator and said reservoir means for removing impurities from the condensation such that the collected condensation is potable and suited for human consumption;

a refrigerator having a water inlet line, a refrigeration system, a cool water reservoir, and a cool water dispenser;

said reservoir means connected with said refrigerator water inlet line and cool water reservoir, and collected condensation in said reservoir means being conducted through said water inlet line to said cool water reservoir of said refrigerator, maintained in a cool condition by said refrigerator refrigeration system, and dispensed as potable water by said refrigerator cool water dispenser; and monitoring and control means for monitoring and controlling the operation of said system and apparatus.

12. A transportable apparatus for producing potable water from moisture-laden air, comprising:

a transportable housing mounted and supported on a movable structure selected from the group consisting of a wheeled cart, a trailer chassis, and a skid, and having air intake means and air exhaust means for conducting air therethrough;

air filtration means for filtering air entering said housing;

a power source selected from the group consisting of alternating current, DC batteries, fuel cells, solar power, DC batteries supplemented by solar cell panels, and gas powered electrical generators, for providing power to said apparatus;

refrigeration means including a refrigerant evaporator and condenser disposed in said housing, a compressor operatively connected with said power source and with said condenser, and an expansion valve operatively connected between said condenser and said evaporator;

said evaporator and said condenser each helically coiled, and said coiled condenser is disposed generally concentrically within said coiled evaporator in a nested relation;

forced-draft means operatively connected with said power source for drawing ambient air into said housing through said intake means, conducting the air in heat exchanging relationship with said evaporator and said condenser, and exhausting the air from said housing;

the refrigerant in a refrigerating cycle being compressed in said compressor and fed through said condenser where it is liquefied to dissipate heat into air passing through said housing then fed through said expansion valve and expanded then fed through said evaporator to abstract heat from air passing through said housing, the air being filtered by said air filtration means and cooled by said evaporator to form condensation thereon and the cooled air being exhausted through said condenser;

reservoir means connected with said evaporator for collecting the condensation formed thereon;

isolating means disposed between said evaporator and said reservoir means for isolating the condensation collected in said reservoir from impurities and from surrounding ambient air temperature;

temperature control means for controlling the temperature of the condensation passing between said evaporator and said reservoir means to facilitate consistent temperature of the condensation collected in said reservoir means;

water filtration means disposed between said evaporator and said reservoir means for removing impurities from the condensation such that the collected condensation is potable and suited for human consumption;

water dispensing means connected with said reservoir means for removing the collected condensation; and monitoring and control means for monitoring and controlling the operation of said apparatus.

13. The transportable apparatus according to claim 12, wherein said reservoir means comprises a first and a second reservoir connected with said evaporator for collecting the condensation formed thereon, and further comprising:

second refrigeration means including, a second refrigerant compressor operatively connected with said power source, a second condenser operatively connected with said second compressor, a second evaporator operatively connected with said second condenser and with said second compressor, and an expansion valve operatively connected between said second condenser and said second evaporator;

said second evaporator disposed in heat exchanging relationship with the collected condensation in said first reservoir, and said second condenser is disposed in the path of air exhausted from said housing;

the refrigerant of said second refrigeration means in a refrigerating cycle being compressed in said second compressor, fed through said second condenser where it is liquefied to dissipate heat into air passing through said housing, fed through said expansion valve and expanded, and fed through said second evaporator to abstract heat from the collected condensation in said first reservoir to provide cool potable condensation; whereby said second refrigeration means is used for cooling collected condensation, and the first said refrigeration means is used for condensing the moisture in the air.

14. The transportable apparatus according to claim 12, wherein said reservoir means comprises a first and a second reservoir connected with said evaporator for collecting the condensation formed thereon, and further comprising:

second refrigeration means including, a second refrigerant compressor operatively connected with said power source, a second condenser operatively connected with said second compressor, a second evaporator operatively connected with said second condenser and with said second compressor, and an expansion valve operatively connected between said second condenser and said second evaporator;

said second evaporator disposed in heat exchanging relationship with the collected condensation in said first reservoir, and said second condenser is disposed in heat exchanging relationship with the collected condensation in said second reservoir;

the refrigerant of said second refrigeration means in a refrigerating cycle being compressed in said second compressor, fed through said second condenser where it is liquefied to dissipate heat into the collected condensation in said second reservoir to provide heated potable condensation, fed through said expansion valve and expanded, and fed through said second evaporator to abstract heat from the collected condensation in said first reservoir to provide cool potable condensation; whereby said second refrigeration means is used for heating and cooling collected condensation, and the first said refrigeration means is used for condensing the moisture in the air.

15. The transportable apparatus according to claim 12, further comprising:
electrical heater means disposed in heat exchanging relationship with the collected condensation in said reservoir means and operatively connected with said power source through temperature control means to provide heated potable condensation.

16. Apparatus for use in a motor vehicle having an engine and electrical system for producing potable water from moisture-laden air, comprising:
an air duct adapted for placement in the vehicle and having air intake means and air exhaust means for conducting air therethrough;
air filtration means for filtering air entering said air duct;
refrigeration means including a refrigerant compressor and a condenser disposed exterior said air duct, and an evaporator disposed in the path of air flowing through said air duct, said compressor powered by the vehicle engine and operatively connected with said condenser, and an expansion valve operatively connected between said condenser and said evaporator, a fan powered by the vehicle electrical system in air flow communication with said evaporator that conducts air from the duct exterior in heat exchanging relationship with said evaporator and conducts cool air into the interior of the vehicle;
the refrigerant in a refrigerating cycle being compressed in said compressor and fed through said condenser where it is liquefied to dissipate heat into the atmosphere, fed through said expansion valve and expanded, then fed through said evaporator to abstract heat from air passing through said air duct, and the air being cooled by said evaporator to form condensation thereon;
reservoir means connected with said evaporator for collecting the condensation formed thereon including means for removing the collected condensation therefrom;
isolating means disposed between said evaporator and said reservoir means for isolating the condensation collected in said reservoir from impurities and from surrounding ambient air temrperature;
water filtration means disposed between said evaporator and said reservoir means for removing impurities from the condensation such that the collected condensation is potable and suited for human consumption; and
monitoring and control means for monitoring and controlling the operation of said apparatus.

17. Apparatus for producing potable water from moisture-laden air comprising:
a housing having air intake means and air exhaust means for conducting air therethrough;
air filtration means for filtering air entering said housing;
first refrigeration means including a first refrigerant evaporator and first condenser disposed in said housing, a first compressor operatively connected with a power source and with said first condenser, and an expansion valve operatively connected between said first condenser and said first evaporator;
forced-draft means operatively connected with said power source for conducting atmospheric air in heat exchanging relationship with said evaporator and said condenser;
the refrigerant of said first refrigeration means in a refrigerating cycle being compressed in said first compressor and fed through said first condenser where it is liquefied to dissipate heat into air passing through said housing then fed through said expansion valve and expanded then fed through said first evaporator to abstract heat from air passing through said housing, the atmospheric air being filtered by said air filtration means and cooled by said first evaporator to form condensation thereon and the cooled air being exhausted through said first condenser;
a first and a second reservoir connected with said first evaporator for collecting the condensation formed thereon;
isolating means disposed between said first evaporator and said first reservoir for isolating the condensation collected therein from impurities and from surrounding ambient air temperature;
second refrigeration means including, a second refrigerant compressor operatively connected with said power source, a second condenser operatively connected with said second compressor, a second evaporator operatively connected with said second condenser and with said second compressor, and an expansion valve operatively connected between said second condenser and said second evaporator;
said second evaporator disposed in heat exchanging relationship with the collected condensation in said first reservoir, and said second condenser disposed in the path of air exhausted from said housing;
the refrigerant of said second refrigeration means in a refrigerating cycle being compressed in said second compressor, fed through said second condenser where it is liquefied to dissipate heat into air passing through said housing, fed through said expansion valve and expanded, and fed through said second evaporator to abstract heat from the collected condensation in said first reservoir to provide cool potable condensation;
temperature control means for controlling the temperature of the condensation passing between said first evaporator and said first and second reservoir to facilitate consistent temperature of the condensation collected in said reservoir means;
water filtration means disposed between said first evaporator and said first and second reservoir for removing impurities from the condensation such that the collected condensation is potable and suited for human consumption; and
monitoring and control means for monitoring and controlling the operation of said apparatus; wherein
said first refrigeration means is used for condensing the moisture in the air, and said second refrigeration means is used for cooling collected condensation.

18. The apparatus according to claim 17, wherein
air diverting means connected in air flow communication between said first condenser and said first evaporator for diverting a portion of heated air from said first condenser back to said first evaporator to prevent freezing and facilitate formation of condensation.

19. The apparatus according to claim 17, wherein
said first evaporator and said first condenser are each helically coiled, and said coiled first condenser is disposed generally concentrically within said coiled first evaporator in a nested relation.

20. Apparatus for producing potable water from moisture-laden air, comprising:

a housing having air intake means and air exhaust means for conducting air therethrough;

air filtration means for filtering air entering said housing;

first refrigeration means including a first refrigerant evaporator and first condenser disposed in said housing, a first compressor operatively connected with a power source and with said first condenser, and an expansion valve operatively connected between said first condenser and said first evaporator;

forced-draft means operatively connected with said power source for conducting atmospheric air in heat exchanging relationship with said first evaporator and said first condenser;

the refrigerant in a refrigerating cycle being compressed in said first compressor and fed through said first condenser where it is liquefied to dissipate heat into air passing through said housing then fed through said expansion valve and expanded then fed through said first evaporator to abstract heat from air passing through said housing, the atmospheric air being filtered by said air filtration means and cooled by said first evaporator to form condensation thereon and the cooled air being exhausted through said first condenser;

a first and a second reservoir connected with said first evaporator for collecting the condensation formed thereon;

a first and a second reservoir connected with said first evaporator for collecting the condensation formed thereon;

isolating means disposed between said first evaporator and said first reservoir for isolating the condensation collected in said reservoir from impurities and from surrounding ambient air temperature;

second refrigeration means including, a second refrigerant compressor operatively connected with said power source, a second condenser operatively connected with said second compressor, a second evaporator operatively connected with said second condenser and with said second compressor, and an expansion valve operatively connected between said second condenser and said second evaporator;

said second evaporator disposed in heat exchanging relationship with the collected condensation in said first reservoir, and said second condenser is disposed in heat exchanging relationship with the collected condensation in said second reservoir;

the refrigerant of said second refrigeration means in a refrigerating cycle being compressed in said second compressor, fed through said second condenser where it is liquefied to dissipate heat into the collected condensation in said second reservoir to provide heated potable condensation, fed through said expansion valve and expanded, and fed through said second evaporator to abstract heat from the collected condensation in said first reservoir to provide cool potable condensation;

temperature control means for controlling the temperature of the condensation passing between said first evaporator and said first and second reservoir to facilitate consistent temperature of the condensation collected in said reservoir means;

water filtration means disposed between said first evaporator and said first and second reservoir for removing impurities from the condensation such that the collected condensation is potable and suited for human consumption; and monitoring and control means for monitoring and controlling the operation of said apparatus; wherein
    said first refrigeration means is used for condensing the moisture in the air, and said second refrigeration means is used for heating and cooling collected condensation.

* * * * *